(12) United States Patent
Hadzikadic et al.

(10) Patent No.: US 7,213,023 B2
(45) Date of Patent: May 1, 2007

(54) INCREMENTAL CLUSTERING CLASSIFIER AND PREDICTOR

(75) Inventors: Mirsad Hadzikadic, Charlotte, NC (US); Benjamin F. Bohren, Logmont, CO (US); Christopher N. Eichelberger, Charlotte, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 0 days.

(21) Appl. No.: 09/855,220

(22) Filed: May 14, 2001

(65) Prior Publication Data
US 2002/0059202 A1  May 16, 2002

Related U.S. Application Data

(60) Provisional application No. 60/240,037, filed on Oct. 16, 2000.

(51) Int. Cl.
*G06F 17/00* (2006.01)
(52) U.S. Cl. ..................... 707/100; 707/104.1
(58) Field of Classification Search ............... 707/100, 707/103 R, 103 X, 103 Y, 103 Z, 104.1
See application file for complete search history.

(56) References Cited

U.S. PATENT DOCUMENTS

| | | | |
|---|---|---|---|
| 4,937,747 A | | 6/1990 | Koller |
| 5,291,593 A * | | 3/1994 | Abraham et al. ........ 707/103 R |
| 5,799,276 A | | 8/1998 | Komissarchik et al. |
| 5,832,495 A * | | 11/1998 | Gustman .................... 707/102 |
| 5,838,965 A * | | 11/1998 | Kavanagh et al. ...... 707/103 R |
| 5,859,929 A | | 1/1999 | Zhou et al. |
| 5,864,839 A * | | 1/1999 | Bourgoin ........................ 707/1 |
| 6,003,040 A * | | 12/1999 | Mital et al. ............. 707/103 R |
| 6,185,550 B1 * | | 2/2001 | Snow et al. .................... 707/1 |
| 6,212,526 B1 * | | 4/2001 | Chaudhuri et al. ......... 707/102 |
| 6,226,792 B1 | | 5/2001 | Goiffon et al. |
| 6,301,579 B1 * | | 10/2001 | Becker ....................... 707/102 |
| 6,307,965 B1 | | 10/2001 | Aggarwal et al. |
| 6,314,420 B1 | | 11/2001 | Lang et al. |
| 6,427,229 B1 * | | 7/2002 | Brobst et al. ............... 717/108 |
| 6,470,337 B1 * | | 10/2002 | Nihei ............................. 707/5 |
| 6,507,843 B1 * | | 1/2003 | Dong et al. .................... 707/6 |
| 6,553,365 B1 * | | 4/2003 | Summerlin et al. ............ 707/2 |

OTHER PUBLICATIONS

Hadzikadic, M. Bohren, B., Hakenewerth, A., Norton, J., Mehta, B., Andrews, C.; "Concept Formation vs. Logistic Regression: Predicting Death in Trauma Patients," Artificial Intelligence in Medicine Journal 8 (1996); pp. 493-504.

(Continued)

*Primary Examiner*—Greta Robinson
(74) *Attorney, Agent, or Firm*—Kilpatrick Stockton LLP

(57) ABSTRACT

The present invention provides mathematical model-based incremental clustering methods for classifying sets of data and predicting new data values, based upon the concepts of similarity and cohesion. In order to increase processing efficiency, these methods employ weighted attribute relevance in building unbiased classification trees and sum pairing to reduce the number of nodes visited when performing classification or prediction operations. In order to increase prediction accuracy, these methods employ weighted voting over each value of target attributes to calculate a prediction profile. The present invention also allows an operator to determine the importance of attributes and reconstitute classification trees without those attributes deemed unimportant to further increase classification structure node processing efficiency.

5 Claims, 18 Drawing Sheets

OTHER PUBLICATIONS

Hadzikadic, M., Bohren, B.F.; "Learning to Predict: INC2.5;" IEEE Transactions on Knowledge and Data Engineering. vol. 9, No. 1, 1997, pp. 168-173.

Bohren, B., Hadzikadic, M., Hanley, E. "Extracting Knowledge from Large Medical Databases: An Automated Approach," Yearbook of Medical Informatics, pp. 381-400, 1996.

Hadzikadic, M. and Yun, D. Y.Y. "Concept Formation by Incremental Conceptual Clustering," Proceedings of the Eleventh International Joint Conference on Artificial Intelligence, Detroit, Michigan, Aug. 20-25, 1989, pp. 831-836.

Hadzikadic, M., Bohren, B.F. 1997. Determining Attribute Relevance in Decision Trees. In Ras, Z.W., Skowron, A. (Eds.). 1997. Foundations of Intelligent Systems, 10$^{th}$ International Symposium, ISMIS '97. Charlotte, NC. pp. 519-528.

Bohren, B, "Unsupervised Learning Via Concept Formation: INC2. 5," *M.S. Thesis*, University of North Carolina at Charlotte, 1993.

Hadzikadic, M. "Automated Design of Diagnostic Systems." Artificial Intelligence in Medicine 4, 1992, pp. 329-342.

PCT International Search Report, PCT/US01/32028, (Jan. 10, 2002).

\* cited by examiner

INCREMENTAL CLUSTERING CLASSIFIER AND PREDICTOR

RELATED PATENT APPLICATION

The present application hereby claims priority to, and incorporates by references in full, U.S. Provisional Patent Application Ser. No. 60/240,037, entitled "Caryatid Incremental Clustering Classifier (CICC)", filed Oct. 16, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to the fields of machine learning and artificial intelligence as applied to information discovery. More particularly, the present invention relates to an incremental clustering classifier and predictor.

BACKGROUND

With the advent of the Internet, one now has access to an incredible amount of information. The information available includes not only data stored both locally and remotely in data repositories, but also real-time data, which may reflect, for instance, telemetry exchanged between a device and a computer or user interaction with a web site. There is a tremendous need for classifying such information in a way that facilitates understanding of the domain of which such information is a part, and also allows for the prediction of attribute values of future members of the domain.

Such information is often so voluminous that humans cannot efficiently characterize it. Thus, artificial intelligence techniques have been developed to take advantage of the processing speed of computers, while approximating the ability of humans to characterize information.

Several conventional techniques exist for the classification of data points. Clustering is one such technique. Clustering is a method of grouping objects having similar characteristics. For example, a cocker spaniel, poodle, and greyhound would be found in a dog cluster. Dissimilar objects like a palomino horse and Himalayan cat, thus, would be found in other clusters (i.e., a horse cluster and a cat cluster).

Clustering techniques include partitioning, hierarchical, density, and model-based methods. Partitioning begins with an initial selection of where data points should be clustered, based primarily on the number of partitions chosen, and further refines this selection by moving data points among partitions in an effort to achieve clusters which contain more closely related members. Partitioning suffers as the clusters become less spherical in shape and as the total number of data points becomes large.

Hierarchical clustering results in the decomposition of an entire data set in either an agglomerative approach in which smaller clusters are combined into larger clusters, or a divisive approach in which larger clusters are decomposed into smaller clusters. This technique is very dependent on the quality of the combine/decompose logic and does not scale well.

Density clustering is based on the proximity of data points. Clusters are considered to be more dense regions of data points and are delimited by sparse regions of data points. However, density clustering requires the user to provide parameters that define cluster characteristics, and slight variations in these parameters may produce radically different clusters.

Another technique, model-based clustering, applies a mathematical model to the data set. Common mathematical models are neural network or statistical model-based. Neural networks, however, often require lengthy processing times—a negative feature if the data set is large or very complex. Statistical methods employ probability calculations to classify data points into concept clusters. Examples of statistical model-based clustering include the COBWEB system and the INC 2.5 system.

The conventional system known as COBWEB constructs a classification tree based upon a category utility determination, which contrasts an intraclass similarity probability to an interclass dissimilarity probability for attribute value pairs. However, COBWEB suffers from some limitations. For example, category utility ignores the difference between class size, which adversely affects prediction quality, and it does not recognize the possibility of a correlation between attributes. Moreover, COBWEB is highly compute-intensive and does not scale well. COBWEB may also produce lop-sided classification trees, resulting in a degradation of performance.

The conventional INC 2.5 system also makes use of statistical model-based clustering. When classifying data, the conventional INC 2.5 system looks for a node with a pre-specified classification criterion. INC 2.5 does not consistently find the best node within the classification tree meeting that criterion. INC 2.5 utilizes the concepts of similarity and cohesiveness, but weights all attributes the same, resulting in a bias in the classification tree. Moreover, INC 2.5 utilizes a single classification tree, unable to take full advantage of parallel processing, and thus experiencing a degradation in performance when processing very large data sets.

What is needed is a system and method for classifying and predicting data points that avoids the disadvantages of conventional systems, while offering additional advantages.

SUMMARY

The present invention provides methods for classifying data (otherwise known as an instance) using a computer system. One embodiment provides for the building of a classification structure by the steps of receiving data to be classified, determining the node within a classification structure in which to best associate this data, and then inserting this data to be classified as a node in the classification structure relative to child nodes or children of the previously determined best node. The resultant classification structure may also be saved in permanent storage for future use.

Nodes within a classification structure are comprised of at least one attribute, which is weighted by a relevance factor. Setting this relevance factor for attributes allows attributes with a higher significance to have a greater impact on the classification process, as nodes are visited in determining the best host or best node with which to associate the data to be classified.

In one embodiment, the best host may be determined by a process in which nodes of the classification structure are visited, and a cohesiveness measurement, ΔCM, between the visited node and the data to be classified is established. The ΔCM value reflects a degree of likeness between the visited node and the data to be classified. The best host determination process allows for the storing of the largest ΔCM value and corresponding visited node at each level of the classification structure. The largest ΔCM value can be easy determined (by a simple ">" numerical comparison), and the associated node is declared the best host. One embodiment performs this best host determination recursively.

Another embodiment of the present invention calculates the ΔCM values for each best host child and the data to be classified, stores counts of the best host children, and stores those calculated ΔCM values that exceed 0.0. Data to be classified is then placed within the classification structure based upon the ΔCM value of each best host child and the stored counts of best host children and ΔCM values exceeding 0.0.

One embodiment of the present invention presents the resulting classification structure in a manner such that the user can readily ascertain differences in at least one characteristic of the nodes of the classification structure. Thus, the value of a particular attribute may trigger a visual contrast mechanism to suggest the exceeding of a threshold. Using color to contrast a node in the classification structure with this attribute value, for example, quickly alerts a user of the existence of a threshold-exceeding node. This is a very valuable feature, in particular, for use with a classification structure that was built from an exceedingly large number of data items.

Another embodiment includes visually contrasting nodes based upon contextual and relationship value differences. Contextual information is environmentally sensitive. A typical example of the effects of context is the graying out of a "copy" option until some text is selected. The state of the "copy" option is context sensitive, i.e., dependent upon an environment in which text is or is not selected. Relationship information represents degrees of belonging to a particular state. For instance, car enthusiasts have often regarded the Camaro and the Firebird as being "sister" cars. Although they are different makes of General Motors' automobiles (i.e., a Chevrolet and a Pontiac, respectively), they are very similar in their styling aspects. Thus a Camaro and a Firebird may be visually represented in a classification structure a having a relationship that is significantly different than another General Motors' car, such as a Cadillac Eldorado.

One embodiment of the present invention provides for visually contrasting nodes based upon discrete value differences. Another embodiment provides for visually contrasting nodes based upon continuous value differences. Yet another embodiment provides for visually contrasting nodes based upon a value exceeding a threshold.

The present invention also provides methods for predicting the attribute values of instances (i.e., data). One embodiment of such methods receives a pre-existing classification structure and an instance to be predicted, determines the best host for the instance to be predicted, and optionally places the instance to be predicted in the classification structure. The instance to be predicted, in fact, comprises at least one attribute value to be predicted. The best host determination and the optional placement of the instance to be predicted processes are performed for prediction using the same techniques as for classification. Prediction may further involve determining a confidence level, or prediction weight, for an occurrence of at least one possible value for the attributes to be predicted (i.e., the target attributes). In an embodiment, a prediction profile, comprising at least one possible attribute value and a corresponding confidence level for that attribute value, is the result produced by the prediction process. Note that a prediction profile may also be a NULL or empty prediction profile.

Another embodiment of the present invention displays the predicted instance in a visually contrasting manner within the classification structure, as was the case for the classification aspect of an embodiment of the present invention. As previously discussed, this allows the user of an embodiment of the present invention to readily ascertain differences in at least one characteristic of the nodes of the classification structure, including the node that was predicted. Also, as previously discussed, the characteristics contrasted may include attribute values of the instance to be predicted, as well as contextual and relationship information.

Still another embodiment of the present invention determines the prediction profile for the instance to be predicted using a Voting technique. With this technique, each value for at least one attribute of at least one best host child is weighted and used to determine the confidence level for each attribute value. A prediction profile is created as a set of the predicted values for the attributes to be predicted and the corresponding confidence level for each predicted value.

Still another embodiment of the present invention determines the prediction profile for the instance to be predicted, or target instance, using a Best Match technique. With this technique, if the determined best host were a class node within the classification structure, then a prediction profile is created as in the Vote technique. If the determined best host were an instance node within the classification structure, then the attribute value and the confidence level of the best host are used directly in the prediction profile. A prediction profile comprises a set of attribute values that are predicted and the corresponding confidence level (or prediction weight) for each predicted attribute value.

Another useful embodiment of the present invention permits a user of the embodiment to refine the number and type of attributes of an instance to be predicted used to create a classification structure, resulting in a more efficient classification structure. After the embodiment of the present invention receives a data set of instances and builds a first classification structure, standardized data can be used to determine the prediction accuracy of this first classification structure. Standardized data is a well-known and/or well-behaved data set, which can be used for comparing the efficiency and accuracy of classification structures. At least one prediction accuracy criterion value is set as a configuration value. Setting a prediction accuracy criterion value, for example, may require a classification structure to predict above a certain threshold, the prediction accuracy criterion value, for the classification structure to be considered useful. Thus, if confidence levels were consistently below 75%, the classification structure used to make these predictions would be considered to be inadequate for a prediction accuracy criterion requirement of 85% or better.

In an effort to decrease the level of processing performed on a classification structure, subsequent classification structures are built using a smaller number of the attributes for the instances in the data set that was used to build the first classification structure. Thus, with each subsequent building process, less processing is required to use the subsequently built classification structure. The embodiment determines the prediction accuracy of each subsequent classification structure, discards inadequate classification structures, and retains at least one such subsequent classification structure that meets each prediction accuracy criterion. The retained classification structure does not contain information on all attributes of the data set instances. The retained classification structure contains information only on those attributes deemed most important, and thus is a faster and more efficient predictor. Additionally, the prediction accuracy meets the requisite accuracy threshold.

An embodiment of the present invention permitting a user to refine the number and type of attributes of an instance to be predicted used to create a classification structure, proceeds with building the first and subsequent classification structures by receiving an instance to be classified, determining a best host for that instance to be classified, and inserting the instance to be classified into a location within the classification structure relative to at least one child of the best host. The nodes within the classification structure and the instance to be classified comprise at least one attribute and a corresponding relevance value.

Another embodiment of the present invention facilitates the building of a federated group of multiple classification structures from the same data set of instances to be classified (or from multiple data sets, which are treated as one large data set), by receiving a data set (or data sets) comprising at least one instance to be classified, receiving a federated group number and then constructing a group of classification structures or other learning methods from the same data set (or sets) of instances to be classified. Federation is not limited to classification structures built by the various embodiments of the present invention. Federation may also be applied to build and utilize classification structures based upon other learning methods.

The federated group number represents the number of classification structures built. The process of building this group of classification structures first comprises selecting the classification overlap number of classification structures. These classification structures are the subset of the federated group into which copies of an instance to be classified are actually classified. This classification process takes place for each instance in the data set. Another such embodiment uses the classification techniques employed for a single classification structure, but distributes processing over multiple structures. Such embodiment receives a classification overlap number of copies of each instance to be classified from the data set of instances to be classified, determines a best host for each copy within each classification structure, and inserts each copy into each classification structure into a location relative to at least one best host child. Each node of a classification structure and each instance copy (and the actual instance) comprise at least one attribute and corresponding relevance value.

An embodiment of the present invention, which facilitates the building of a federated group, comprises randomly selecting the subset of the federated group. For example, if a classification overlap of two and a federated group of five were specified, then the classification structures selected to classify instance #1 might be classification structures #1 and #2. Instance #2 might be classified in structures #2 and #4. Instance #3 might be classified in classification structures #1 and #3. This would continue until all instances have been classified into two classification structures.

Embodiments of the present invention may use various prediction profiles. For example, one embodiment of the present invention provides for predicting by receiving a group of classification structures, receiving an instance with at least one attribute to predict, using each classification structure that is a predicting member of a subset of a group of classification structures to predict on the instance with at least one attribute to predict, and coalescing (or combining) the prediction profiles from each predicting member. The prediction coverage designates which classification structures will be queried for a prediction. As another example, an embodiment provides an Ameliorate prediction profile. The Ameliorate prediction profile is the average of the prediction profiles returned from each queried classification structure.

Another embodiment provides a Winner-take-all prediction profile. The Winner-take-all prediction profile is the best prediction profile of those returned from each queried classification structure. The best profile is the one that possesses the highest confidence level.

In order to address shortcomings of the conventional art, the present invention provides very efficient methods for classifying sets of data and predicting new data values. An advantage of an embodiment of the present invention comprises providing data classification, using weighted attribute relevance in the calculation of similarity and cohesiveness values in order to build an unbiased classification tree. Additionally, "sum pair values" are calculated in which parent nodes contain a summary of information about their children. The sum pair values comprise attributes, values and number of occurrences of the attributes of each child, and are summarized in the parent node of each child. This reduces the number of nodes that must be visited when processing a tree built by the present invention, which in conjunction with the building of an unbiased tree, results in very efficient classification and prediction mechanisms.

Other advantages include the efficient and accurate prediction of attribute profiles for new and incomplete instances. An embodiment of the present invention uses weighted attribute relevance, calculates similarity and delta cohesiveness measurement values to find the best host in a classification tree, and uses sum pair calculations to reduce the number of nodes processed, thereby increasing prediction accuracy and efficiency.

An additional advantage of an embodiment of the present invention is to aid an operator in the understanding of the problem (or data set) domain. One way this is accomplished is by a visualization feature in which an embodiment of the present invention highlights differences among data instances by visually contrasting the representation of those instances within the classification tree, based upon distinguishable attribute, context and/or relationship values. This goal is also achieved through the "What if?" feature that allows an operator to manipulate data attribute values and immediately view the effects on the classification of the manipulated data.

Another advantage of an embodiment of the present invention is to allow an operator to closely manage resources by determining the importance of attributes, filtering out the attributes that contribute little to the classification (and prediction) processes, and to rebuild a classification tree using only those attributes deemed important. The resulting classification tree is a faster predictor because fewer attributes per node need to be processed when making subsequent predictions, thus enhancing the efficiency of the present invention.

An example is the case of a physician who has a large number of tests in his repertoire of diagnostic tools. However, not all available tests carry the same diagnostic weight. Some may be only marginally relevant. Therefore the physician, using an embodiment of the present invention, can determine which diagnostic tests (i.e., attributes) are most important, reconstruct the classification tree based upon historical patient data regarding the important tests, and then classify current patients using the reconstructed tree. The advantage seen by the doctor is that prediction using the reconstructed tree is faster, because there are fewer attributes to process. The advantage seen by the patient is that rather than having a large number of tests performed, the patient may need only five or six (the number of attributes deemed important). The patient thus saves time and money by taking five or six diagnostic tests rather than a large number of tests.

Another advantage of an embodiment of the present invention is to enable federated processing. By establishing a federated group of trees, an operator of the present invention can process multiple trees on different processors. Federated processing results in better scalability, i.e., an ability to efficiently process very large data sets, and the ability to classify and predict in real-time.

Advantages of embodiments of the present invention also include: scalability, which is the ability to process very large data sets without suffering performance degradation; federation capability, which is the ability to operate using multiple classification trees in a parallel processing environment; increased efficiency of computation from the summing that takes place in class nodes; increased prediction accuracy from attribute weighting in the classification stage and weighted voting in the prediction stage; real-time prediction capability; the ability to estimate the importance of attributes and to rebuild the tree using only those important attributes, which helps to conserve computing resources and builds better trees for prediction purposes; the building of persistent classification trees; the ability to explore a data domain space by making predictions in real-time using the "What if?" capability; and, the ability to visually contrast distinguishing features, such as attribute, context and/or relationship values, which provides an additional dimension to the data and is a very advantageous feature for exposing distinguishing features in classification trees built from large data sets.

An embodiment of the present invention uses "sum pair values" calculations, federation, parallel processing, and a small footprint to produce classification and prediction results in real-time. Sum pair values are the summation of information in a parent node about all children of that parent node. For instance, if child node A contains attribute values big, blue and circle, and child node B contains attribute values big, blue and square, then the summary information will contain 2-big, 2-blue, 1-circle, and 1-square attribute values. Storing such information in the parent node allows the system to reduce the number of nodes that must be processed during classification and prediction. Federation, as previously discussed, permits the processing of multiple classification structures on multiple processors (i.e., parallel processors). A small footprint ensures that more random access memory is available for processing. Note that another embodiment, in which the methods of the present invention are executed on a single, high-powered processor, can also perform classification and prediction in real-time.

As an example of real-time processing, an embodiment of the present invention performs prediction on a Monks-3 dataset within 5 to 25 milliseconds per record. A Monks-3 dataset is a canonical machine learning dataset of approximately 6 attributes for each of 150 records. Note that various parameters can influence processing time, such as the prediction coverage parameter chosen for a federated set of classification structures.

An embodiment of the present invention may be used as an operational, research or training tool to solve problems in many different domains. For instance, in the field of medicine, classification trees can be built using historical patient data. In an operational environment, an embodiment of the present invention can build trees for use as a diagnostic tool to aid medical professionals in lifestyle risk analysis, diagnosis and formulation of a course of treatment for a current patient. In a research environment, an embodiment of the present invention allows research scientists to share pre-existing trees, in addition to building trees from new data sets. The scientists can thus take advantage of: persistent trees; the scalability feature to analyze very large data sets; the "What if" feature to vary attribute values to explore changes in real-time; and, the visualization feature to discover subtle differences in attributes, contexts and/or relationships (especially, within trees built from large data sets). And, in a training environment, e.g., a teaching hospital, interns in every field can have exposure to virtually an unlimited number of patients by using persistent trees built for their particular specialty (oncology, trauma, anesthesiology, etc.). The classification tree allows an intern to refine her abilities by comparing her diagnoses versus those provided by experts in the field, i.e., a classification tree comprised of historical patient data relevant to her specialty. Conceivably, then, even a small, rural teaching hospital will be able to take advantage of knowledge from medical experts from all over the world.

Some additional domains in which one can readily ascertain applicability of various embodiments of the present invention include network security (by characterizing network traffic and comparing a user's actions to the profile of an intruder), wireless applications (using location data to correlate a user's movements with the profile of a traveler in need of a service or product), financial applications (to predict likelihood of default), direct marketing (to select, from a database, persons most likely to be influenced by a particular direct marketing campaign for goods or services), internet privacy (using a model of browsing preferences to act as the motive element within an agent that automatically vets web sites), education (as a tool to assess faculty strengths and weaknesses), law enforcement (to classify crime statistics and predict future crimes and their locations), and the Internet (as a search engine which returns a percent similarity rating for returned documents or as a site user profiling tool).

Much of the preceding discussion dealt with various environments in which there are vast amounts of stored data. However, in addition to the volume of stored data, there is also much eCommerce transactional data that could be very useful if categorized properly. For instance, although many companies are focusing on marketing and data mining to create customers or on Customer Relationship Management (CRM) to retain their current customer base, no one is focusing on the point of sale aspect of making the closing pitch (i.e., changing a shopper into a buyer in real-time, much like a car salesman, for example, who interacts face to face with a buyer and can even tailor the deal in order to convince the shopper to purchase a vehicle now). By characterizing the current shopper's interactions with a web site, and making comparisons within a classification tree, predictions can be made at each step of the web site browsing transaction as to when this shopper should be offered an incentive (i.e., a coupon, free shipping, etc.) that would likely turn the shopper into a buyer of a product offered for sale.

Additional objects, advantages, and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 14 shows a GUI screen capture of a "What if?" option of an embodiment of the present invention with collected attribute values and predicted browse/buy confidence levels for a web shopper filled in.

DETAILED DESCRIPTION

In one embodiment, the present invention provides a process for the efficient classification of data and real-time prediction of data attribute values. There are a large variety of applications in which the present invention may be used. For example, in one embodiment a real-time mechanism for providing an incentive via a web server to an eCommerce customer who has been predicted as likely to make a purchase, if provided with such an incentive, may be provided. Such an embodiment is used herein as an illustration to facilitate the description of the invention.

In the following description, numerous specific details are set forth in order to provide a thorough understanding of the present invention. It will be obvious, however, to one skilled in the art, that the present invention may be practiced without some or all of these specific details. In other instances, familiar process operations have not been described in detail in order not to unnecessarily obscure the description of the present invention.

Figure 1:
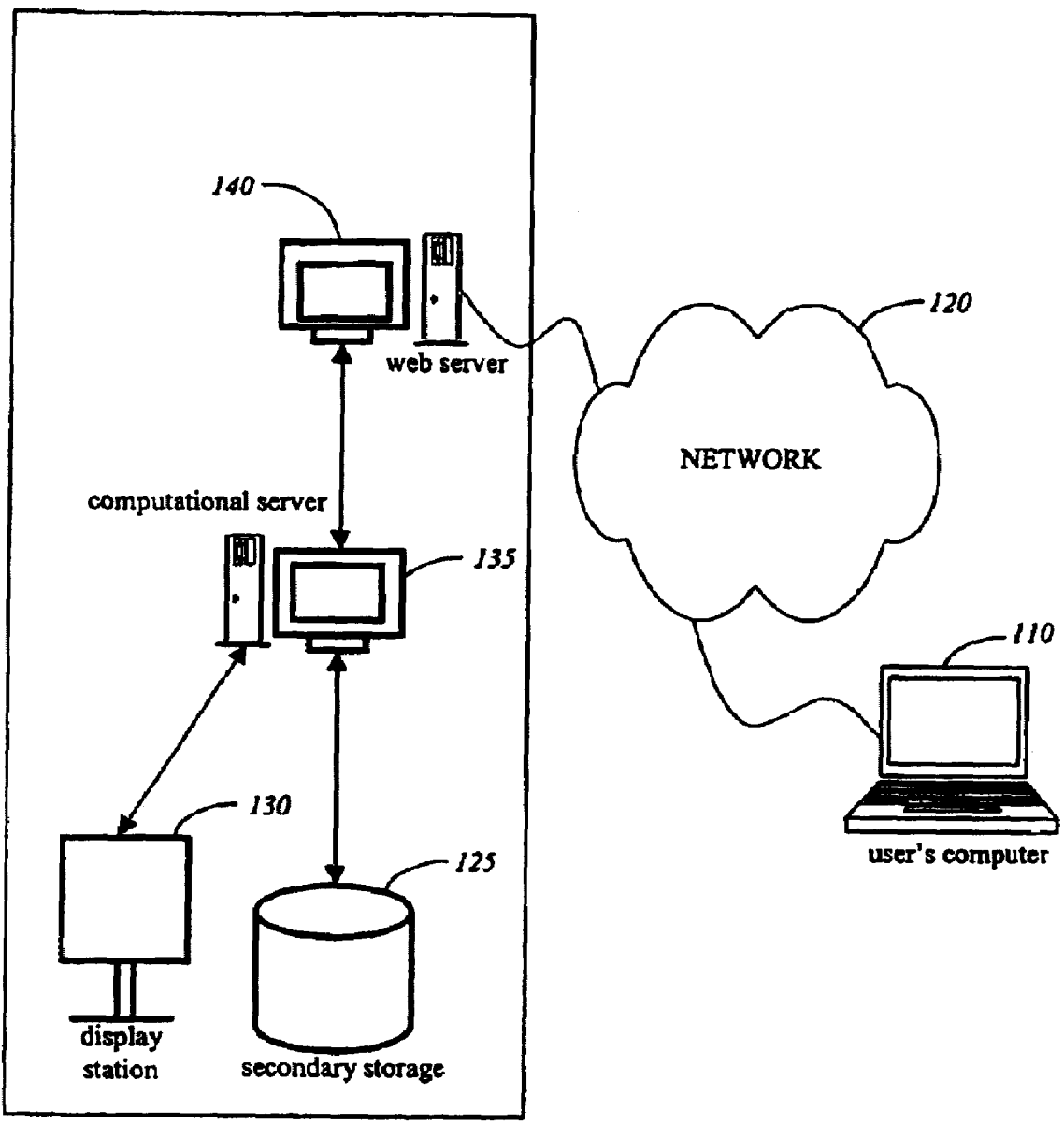
FIG. 1 shows a diagram of an embodiment of the present invention in a networked environment.

FIG. 1 illustrates one embodiment of the present invention in a networked environment. A user computer 110 interfaces to a network 120 via direct dial, Ethernet, router, or another networking technology. Types of user computing equipment 110 include, but are not limited to, a personal computer (PC), workstation, laptop, palmtop, personal digital assistant (PDA), and other devices capable of displaying a user interface. Types of networks include, but are not limited to, Local Area Networks (LANs), Personal Area Networks (PANs), Metropolitan Area Networks (MANs), Wide Area Networks (WANs), the Internet/World Wide Web (WWW) and the like.

User's computer 110 exchanges messages with a web server via a protocol such as HyperText Transfer Protocol (HTTP). The web server 140 sends web pages for display on user's computer 110 in response to requests from the user. Such requests may include search requests or simply navigational requests (i.e., "follow this link").

In an embodiment illustrated in FIG. 1, the present invention display software resides on display station 130, which would include, but not be limited to, a PC, workstation, laptop, palmtop, PDA, and other devices capable of displaying a user interface. Computational software resides on the computational server 135, which would include, but not be limited to, a PC, workstation, laptop, VME chassis comprising multiple processors, and other devices capable of performing computations.

Computational server 135 also interfaces to secondary storage 125. Secondary storage 125 stores pre-existing (persistent) classification trees or data files from which computational server 135 receives the instances or data points for building classification trees. Secondary storage 125, would include, but not be limited to at least one of a hard drive, magnetic tape, disk array, optical storage, CD juke box and DVD storage device, and may be internal to, external to, or remotely located from the hardware implementing an embodiment of the present invention.

In such an embodiment, as a user navigates the World Wide Web, an HTTP request is sent from the user's computer 110 via network 120 to web server 140 for each web page selection, and the user's browsing profile is updated via messages sent from the web server 140 to the computational server 135, which, in turn, updates a Graphical User Interface (GUI) display on display station 130. Updating the GUI display of display station 130 might include, by way of example, changing a visual aspect (i.e., location, color, shape, etc.) of the node within the classification tree that represents the user. The visual aspect change reflects an attribute, context and/or relationship value change associated with the web browsing user, like a change in status from that of a mere shopper to a shopper who is likely to make a purchase.

Thus, the computational software recognizes "cusp" customers, who are on the threshold of buying. In such a case, computational computer 135 sends a message to web server 140, which, in turn, displays a coupon or other incentive (such as, but not limited to, free shipping, expedited delivery, etc.) on the web page displayed on user's computer 110. Note that computational computer 135 could also be prodded at this point manually, via an operator message initiated at the display computer 130, to send a "display incentive message" to web server 140.

Another embodiment of the present invention comprises executing only the computational software. The user's computer 110 sends a request message to the web server 140, which sends messages to both the computational server 135 and the user's computer 110 via a networked environment, as previously described. However, the display feature on the display computer 130 is turned off (or simply ignored). The computational server 135 is used in such an embodiment for automatic generation of messages to the web server, as in the shopper/buyer example previously presented, or merely to collect data on web site users and build a classification tree for later use. Running the computational server 135 in such a background mode from 10 PM to 4 AM, for example, may be done to generate a characterization of nighttime visitors to a particular web site.

Another embodiment of the present invention comprises executing both the computational and display software on the same computing device (130, 135 or 140) attached to a network 120.

Yet another embodiment of the present invention comprises executing computational software on computational server 135 and display software on display computer 130, both computers (130 and 135) attached, directly or indirectly, to network 120, and with communication for the purposes of this invention taking place only between these computers (130 and 135). Such a scenario is used to construct a classification tree from training data that is input manually or read in as a file. For instance, data reflecting various attributes of breast cancer patients (i.e., age, weight, smoker, blood test results, none or malignant or benign, etc.) may be used to build a classification tree to aid health care professionals in the diagnosis or risk assessment of current patients. Note that such data can be entered locally at computational server 135 or remotely over the network, and this data can be added incrementally (one patient at a time) or as a batch file (of historical patient records). Note, however, that data from a batch file is processed in an incremental or one node at a time fashion.

Other embodiments of the present invention include, but are not limited to, executing all software subsystems on a standalone single or multiprocessor computer, further breaking out of the software to execute on more than two computers, using computer systems in place of computational server 135 and/or display computer 130, and operating the invention hardware platforms (130 and 135 in FIG. 1) on different network segments.

Figure 2:
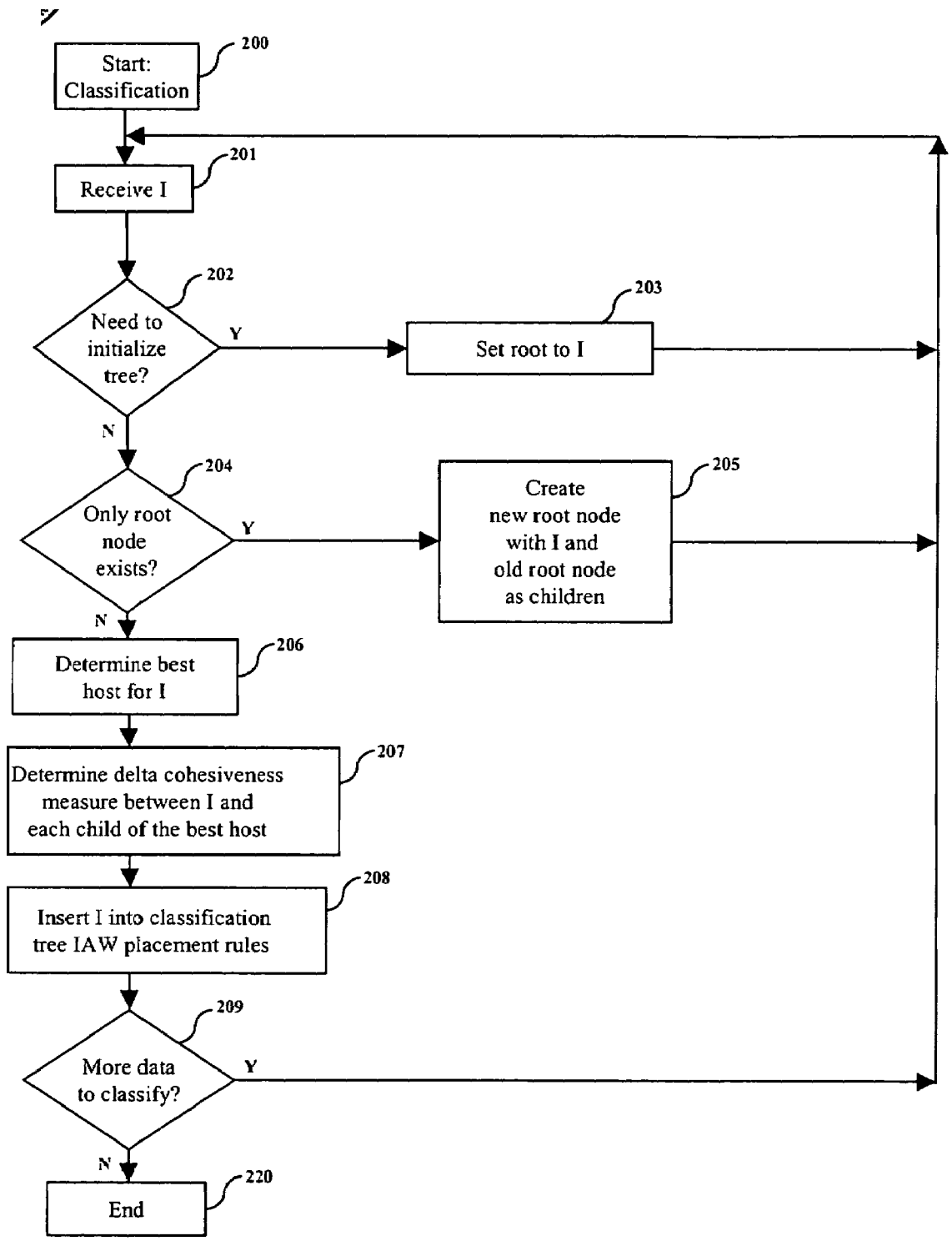
FIG. 2 comprises a flowchart of a classification mechanism according to an embodiment of the present invention.

An embodiment of a classification mechanism according to the present invention is shown in FIG. 2. An overall classification mechanism comprises a computational server 135 first receiving an instance to be classified (the instance comprising at least one attribute value and corresponding relevance value), next determining a best host for the instance to be classified, and then inserting the instance to be classified into a location relative to at least one best host child within the classification tree, where the nodes of the classification tree also comprise at least one attribute value and corresponding relevance value.

Referring to FIG. 2, the computational server 135 starts the overall classification tree building process in step 200. In step 201, computational server 135 receives an instance to be classified from secondary storage 125. An instance comprises a data point, which represents a specific type of object that possesses certain characteristics or attributes. In the embodiment shown, the attribute values are discrete, but in another embodiment the attribute values may be continuous. For example, an instance may represent a patient and possess attribute values for age, weight, height, blood pressure, and results from other diagnostic tests. Next, computational server 135 makes a decision in step 202 as to whether a classification tree needs to be initialized. A classification tree is a data structure into which an embodiment of the present invention places the instance. A classification tree is an embodiment of a classification structure. Visually, a classification tree looks like an inverted tree, and the placement of an instance as a node within that inverted tree structure is near like nodes (i.e., in a cluster) as determined by an embodiment of the present invention. If a classification tree needs to be initialized, computational server 135 sets the root node equal to instance I in step 203.

A root node is the first node in a tree structure and is found at the top of the tree. At the opposite end of the tree are leaf nodes, which have no children. Nodes are categorized as being a parent, child or sibling, depending upon their relationship to each other within a tree. A parent is one level closer to the root node than a child node of that parent. Siblings are children of the same parent, and thus are on the same level in a tree structure. Nodes of a classification tree in an embodiment of the present invention are further categorized as class and instance nodes. A class node, also referred to as a class concept node, represents a generic data type. An instance represents a specific object (i.e., an instantiation) of a class. Although an instance node may never be a parent, a class node can be a parent to either an instance node or another class node, the latter also referred to herein as a class node or a subclass node. For example, a root node may represent a generic data type (or class) of Automobile, which is the parent of a child node, Ford, which, in turn, is the parent of a child node, Taurus. Ford is categorized as a child with respect to Ford's parent, which is the class node Automobile. Ford is also categorized as a subclass, because Ford represents a generic type (or class) of cars and is also a child of the Automobile class. Taurus represents an instance of the Ford class and is also a leaf node, since Taurus has no children.

Note that in one embodiment of the present invention, attributes comprise discrete values. In other embodiments, however, attribute values may be continuous.

Referring back to FIG. 2, if a classification tree is already initialized, computational server 135 determines in step 204 whether only one node (i.e., the root node) exists in a classification tree at this point. If only one node (i.e., the root node) exists at this point, then computational server 135 creates a new root node, and inserts I and the old root node as children of the new root node in step 205. If more than one node exists in the classification tree at this point, the best host for I is recursively determined in step 206 with the best host being stored and updated at each level of processing in the classification tree. A best host is a node in the classification tree that exhibits the greatest cohesiveness to the instance being classified, as reflected by the delta cohesiveness measure ($\Delta CM$). The higher the $\Delta CM$ value the greater the cohesiveness. Conceptually, the best host determination is exhaustive. Although not every node is actually visited (summing of the children's information in the parent node reduces the number of nodes processed), recursion (and thus the storing of the current best host as processing occurs) enables the finding of the ultimate best host within the classification tree. The best host determination will be explained in further detail in the discussion of FIG. 3.

Once a best host determination is made, a delta cohesiveness measure ($\Delta CM$) is calculated for I and each child of the best host in step 207. The delta cohesiveness measure indicates the degree of cohesion between I and each best host child. This step is explained in further detail in FIG. 4. The instance I is then inserted into the classification tree in step 208. The rules for I's placement in relation to the best host children will be presented in detail in the discussion of FIG. 5. In step 209, it is determined whether more data is to be classified. If more data is to be classified, then the next instance is received in step 201, and classification continues in steps 202 through 209. If no more data is to be classified, then classification ends at step 220, resulting in a tree structure of classified instances (i.e., data points).

Figure 3:
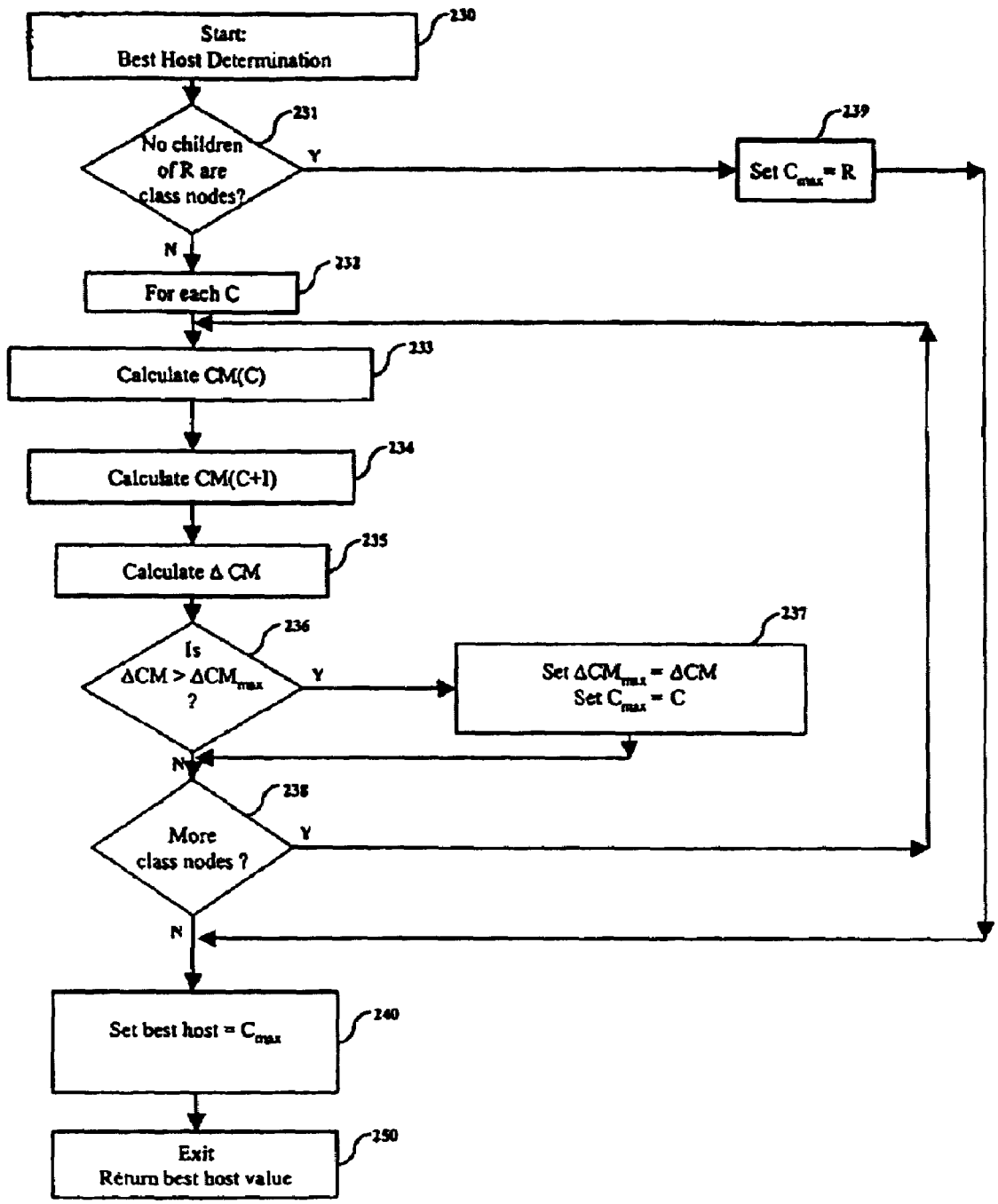
FIG. 3 comprises a flowchart of a best host determination according to an embodiment of the present invention.

FIG. 3 shows a flowchart of a best host determination according to an embodiment of the present invention. The best host determination proceeds by the computational server 135 processing class concept nodes, comprising receiving a class concept node of a classification tree, calculating a delta cohesiveness measure (ΔCM) value between the instance to be classified and the class concept node, and storing the largest ΔCM value and corresponding class concept node at each level of the classification tree. The computational server 135 then determines the largest ΔCM value over all levels of the tree and stores the class concept node corresponding to the largest ΔCM value as the best host. Computational server 135 can perform this best host determination process recursively.

Referring now to FIG. 3, which explains in further detail the best host determination of step 206 in FIG. 2, the computational server 135 begins the best host determination in step 230. As previously stated, the best host determination is performed recursively, which allows the current best host at each tree level to be stored during processing and results in finding the most likely best host in the entire classification tree.

In step 231, computational server 135 determines the number of child class nodes, C, of the root, R, of the classification tree. If there are none, then the value for R is stored in step 239 as $C_{max}$. Otherwise, for each child class node, C, the computational server 135 loops over steps 232 through 238.

In the first step of the loop, computational server 135 calculates the cohesiveness measure of the node C, or CM(C), in step 233. To calculate CM(C), computational server 135 executes equations EQ. 1 through EQ. 6 below:

in conventional art systems. The relevance value in an embodiment of the present invention is a user configurable parameter. The weighting of attributes by a relevance factor results in a tree structure that is more "bushy" in look, rather than having a taproot structure. This means that fewer nodes will be visited for prediction purposes, resulting in a more efficient processing mechanism than conventional art systems.

Next, computational server 135 calculates the similarity function sim (A,B). The similarity function is a measure of the similarity between sibling nodes, as expressed by the following equation:

$$sim(A, B) = \frac{\rho(A, B) - \alpha(A, B) - \beta(A, B)}{\rho(A, B) + \alpha(A, B) + \beta(A, B)} \quad \text{EQ. 4}$$

The computational server 135 then calculates the sum pair values of the node C, which is denoted as SP(C) in EQ5. The sum pair values is a summation of child attribute values at the parent node level. Storing sum pair values in the parent node decreases the number of comparisons necessary during processing, and thus contributes to the increase in efficiency of the present invention over the conventional art. The sum $$\rho(A, B) = \sum_{i=1}^{|A|} \sum_{j=1}^{|B|} \begin{cases} \text{count}(A_i) \cdot \text{relevance}(A_i), & \text{if attribute}(A_i) = \text{attribute}(B_j) \\ 0, & \text{otherwise} \end{cases} \quad \text{EQ. 1}$$

$$\alpha(A, B) = \sum_{i=1}^{|A|} \sum_{j=1}^{|B|} \begin{cases} \text{count}(A_i) \cdot \text{relevance}(A_i), & \text{if attribute}(A_i) \neq \text{attribute}(B_j) \\ 0, & \text{otherwise} \end{cases} \quad \text{EQ. 2}$$

$$\beta(A, B) = \quad \text{EQ. 3}$$

$$\sum_{i=1}^{|A|} \sum_{j=1}^{|B|} \begin{cases} \text{count}(B_j) \cdot \text{relevance}(B_j), & \text{if attribute}(B_j) \neq \text{attribute}(A_i) \\ 0, & \text{otherwise} \end{cases}$$

The term ρ(A,B) represents a count, count($A_i$), of the attribute values in both A and B weighted by a relevance factor, relevance($A_i$). The term α(A,B) represents a count of the attribute values in A but not B, count($A_i$), weighted by a relevance factor, relevance($A_i$). And, the term β(A,B) represents a count of the attribute values in B but not A, count($B_j$), weighted by a relevance value, relevance($B_j$). The count of a feature (or attribute value) is the number of occurrences of that feature within a node of interest or within all of that node's children. The relevance factor reflects the influence of the attribute value on the classification determination. The relevance factor ranges in value from 0 to 1, and the higher the value, the greater the impact on the classification determination. Variables A and B in these equations represent class nodes and an instance I in step 206 of FIG. 2, and children of the best host and an instance I in step 207. The relevance factor removes attribute bias found pair values, SP(C) is calculated in accordance with the equation:

$$SP(C) = \quad \text{EQ. 5}$$

$$\sum_{k=1}^{NC(C)} SP(C.childs_k) + \sum_{i=1}^{NC(C)-1} \sum_{j=i+1}^{NC(C)} sim(C.child_i, C.child_j) \cdot$$

$$NU(C.child_i) \cdot NU(C.child_j)$$

where the function NU( ) comprises the number of instances stored beneath a child node C.child$_i$ or C.child$_j$ (and is equal to 1 if C.child$_i$ or C.child$_j$ is an instance node, rather than a class node), and the summation limit NC(C) comprises the number of children directly beneath class node C. C.child$_i$ and C.child$_j$ represent children of the node C.

Next, computational server 135 calculates the cohesiveness measure of C as the sum pair values of C divided by the number of instances beneath class node C taken twice (i.e., the binomial expansion of NU(C)).

$$CM(C) = \frac{SP(C)}{\binom{NU(C)}{2}} \quad \text{EQ. 6}$$

In step 234, the computational server 135 calculates the cohesiveness measure of the class node C with I added as a child (i.e., CM(C+I)). To calculate CM(C+I), computational server 135 executes equations EQ. 1 through EQ. 6, as performed previously for the CM(C) calculation.

Next, the computational server 135 executes step 235 to calculate the ΔCM value, as expressed in the following equation:

$$\Delta CM = \Delta CM(C,I) = CM(C+I) - CM(C) \quad \text{EQ. 7}$$

The delta cohesiveness measure, ΔCM, ranges in value from −1.0 to +1.0. ΔCM reflects the "cohesion" between nodes. The larger the ΔCM value, the closer the nodes are clustered together in a classification structure. Computational server 135 then executes step 236 to determine if the just calculated ΔCM value is the largest calculated thus far. If so, then the currently calculated ΔCM value and the current C value are stored in step 237 as $\Delta CM_{max}$ and $C_{max}$, respectively.

Computational server 135 then determines if there are more class nodes to process in step 238. If so, then control is returned to step 232. If not, then control passes to step 240, where the best host value, BH, is set to $C_{max}$. Computational server 135 then exits the best host determination via step 250, returning the best host value.

Figure 4:
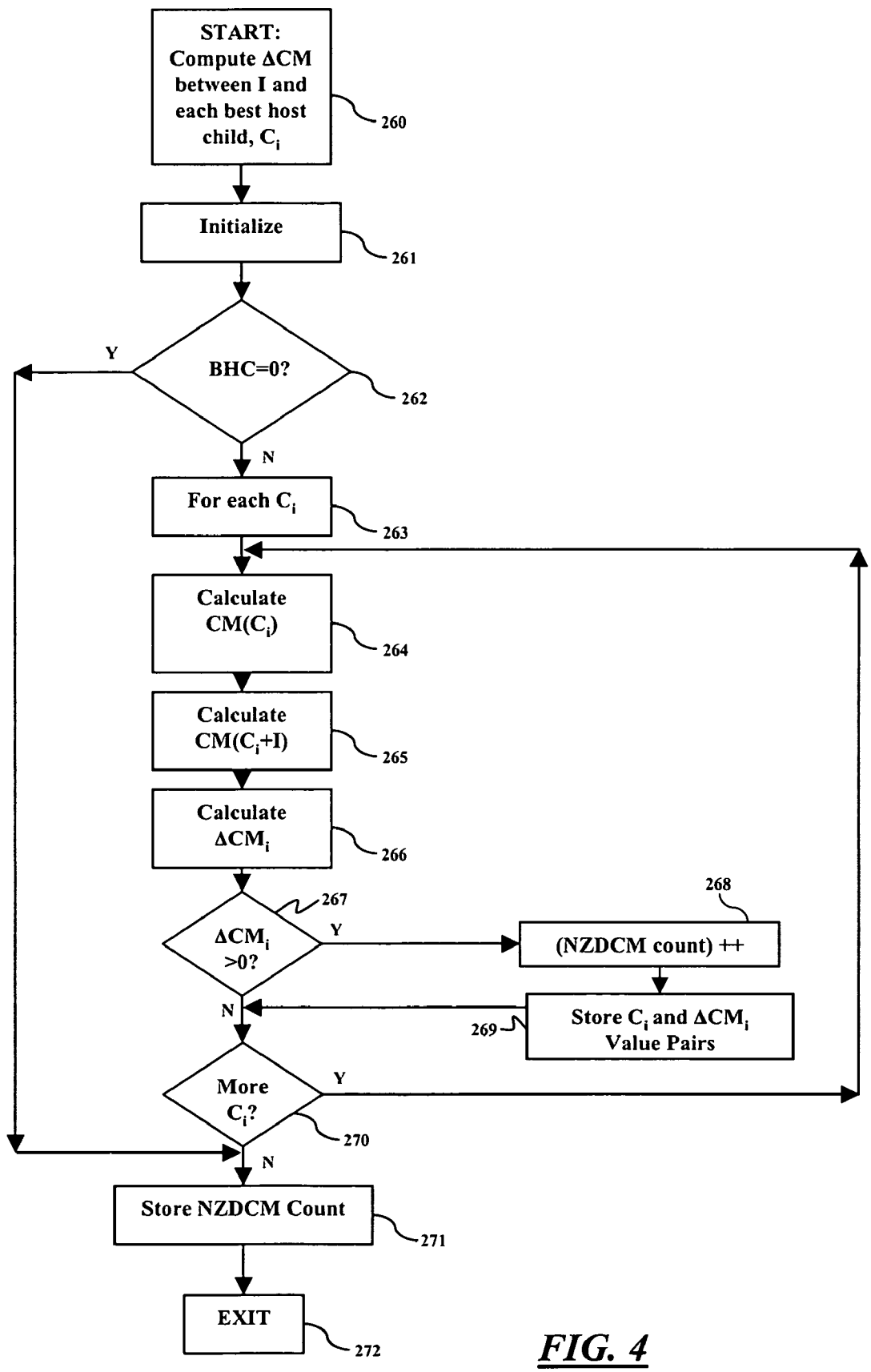
FIG. 4 comprises a flowchart of a determination of a cohesiveness measure difference between an instance to be classified (I) and children of a best host in accordance with an embodiment of the present invention.

FIG. 4 shows a flowchart of the determination of a cohesiveness measure difference between an instance to be classified, I, and children of a best host in accordance with an embodiment of the present invention. Referring now to FIG. 4, which further expands upon step 207 of FIG. 2, computational server 135 starts the routine for the computation of ΔCM between the instance to be classified, I, and each child of the best host in step 260. The initialization performed in step 261, includes setting to zero the variable for storing the count of non-zero delta CM values (NZDCM).

Computational server 135 determines the count of best host children (BHC) in step 262. If BHC is zero, the NZDCM count (which is also zero) is stored in step 271, and processing exits at step 272.

If BHC is non-zero in step 262, then the computational server 135 loops over steps 263 through 270. In step 274, computational server 135 calculates the CM value of the current best host child, CM ($C_i$), using equations EQ1 through EQ6, which were previously discussed for FIG. 3. Next, computational server 135 performs step 265 by calculating the cohesiveness measure for I, CM($C_i$+I), again using equations EQ1 through EQ6. The delta cohesiveness measure, $\Delta CM_i$, for I and the current best host child $C_i$ is then calculated in step 266, using EQ7.

If the $\Delta CM_i$ value is greater than zero, as determined in step 267, the computational server 135 increments the NZDCM count in step 268 and stores the best host child ($C_i$) and the associated $\Delta CM_i$ value in step 269.

If there are more best host children, as determined by the computational server 135 in step 270, then control passes back to the top of the loop for further processing. If there are no further best host children to be processed, then computational server 135 stores the NZDCM count in step 271 and exits in step 272.

Figure 5:
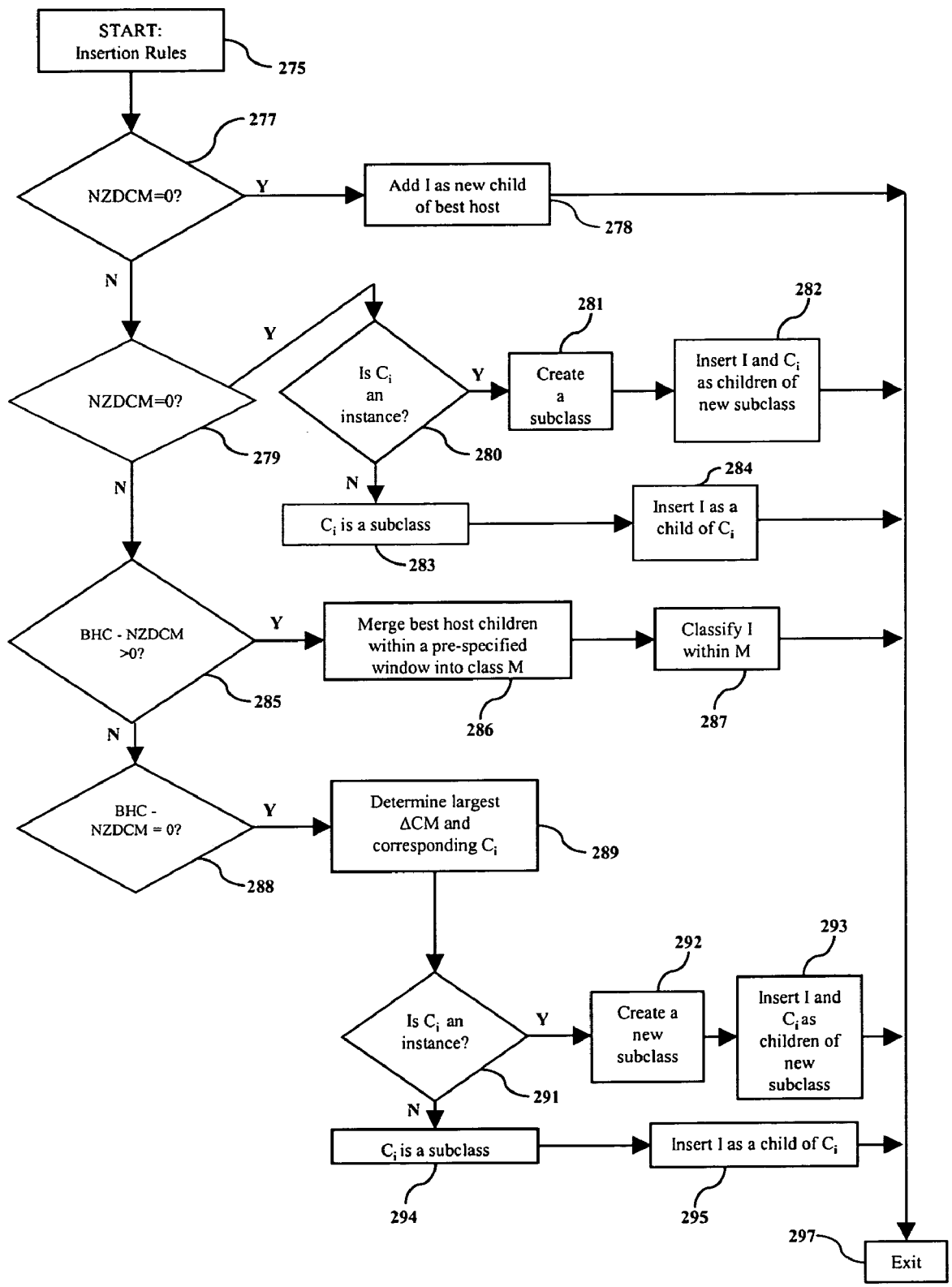
FIG. 5 comprises a flowchart of a set of placement rules for inserting an instance to be classified (I) into a classification tree in accordance with an embodiment of the present invention.

FIG. 5 illustrates a flowchart of a set of placement rules for inserting an instance to be classified, I, into a location within a classification tree relative to at least one best host child, according to an embodiment of the present invention. Computational server 135 implements these placement rules by first selecting the best host children, then calculating a ΔCM value between the instance to be classified and each of the best host children. Computational server 135 next stores the calculated ΔCM values greater than 0.0 and the associated best host children, then stores a count of the total number of best host children, and finally stores a count of the calculated ΔCM values greater than 0.0. Computational server 135 then adds the instance to be classified to the classification tree as a sibling or child of a best host child, depending upon the stored ΔCM and count values. In the event that no best host children exist (or only a "NULL" best host child exists), computational server 135 adds the instance to be classified to the classification tree as a child of the best host.

Referring now to FIG. 5, which provides further detail of step 208 in FIG. 2, computational server 135 executes at least one of the four decision steps (277, 279, 285, 288) in order to place I into the classification tree built by an embodiment of this invention. In the first decision step 277, computational server 135 looks at the value of the NZDCM count, which was previously set in accordance with the discussion of FIG. 4. If this count is zero, then in step 278 the instance to be classified I is added as a new child of the best host, and processing exits at step 297.

Computational server 135 executes step 279, if the result of decision step 277 is "no". In step 279, computational server 135 determines whether the NZDCM count is 1. If so, then there is exactly one best host child $C_i$ with a non-zero ΔCM value. Next, computational server 135 ascertains whether $C_i$ is an instance in step 280. If so, a new subclass is created in step 281, and both I and $C_i$ are added as children of the new subclass in step 282. Processing then exits at step 297. If $C_i$ is not determined to be an instance, then it is a subclass (step 283), and I is inserted as a child of the best host child, $C_i$, (i.e., the subclass) in step 284. Processing then exits at step 297.

Computational server 135 executes step 285, if the results of decision steps 277 and 279 are both "no". Computational server 135 subtracts the NZDCM count from a count of the total number of best host children, BHC, in step 285. If the result is greater than zero, then there is more than one best host child, together with instance I, that produces a ΔCM greater than 0.0. Computational server 135 executes step 286 next and merges the best host children within a pre-specified ΔCM window into a new class, M. For example, if the best host children produce ΔCM values of $C_1$=−0.1, $C_2$=0.2, and $C_3$=0.3, and the pre-specified ΔCM window is 0.15, then a new subclass node, M, will be created under the best host, and $C_2$ and $C_3$ become children of M (and grandchildren of the best host). Next, computational server 135 executes step 287 and classifies I within M, using the classification procedures previously discussed. Processing then exits at step 297.

If processing has fallen through decision steps 277, 279 and 285, the computational server 135 executes step 288, in which it is determined whether the count of the total number of best host children, BHC, equals the NZDCM count. If such is the case, then each best host child, taken together with instance I, yields a ΔCM value greater than 0.0. Computational server 135 determines the largest ΔCM in step 289 and proceeds to combine I with the best host child which yielded the largest ΔCM value, as described in steps 291 through 295.

In step 291, computational server 135 determines if $C_i$, the best host child which yielded the largest ΔCM value, is an instance. If so, a new subclass is created in step 292, and both I and that best host child, $C_i$, are added as children of the new subclass in step 293. Processing then exits at step 297. If that best host child, $C_i$, was not determined to be an instance, then it is a subclass (step 294) and I is inserted as a child of that best host child, $C_i$, in step 295. Processing then exits at step 297.

Figure 6:
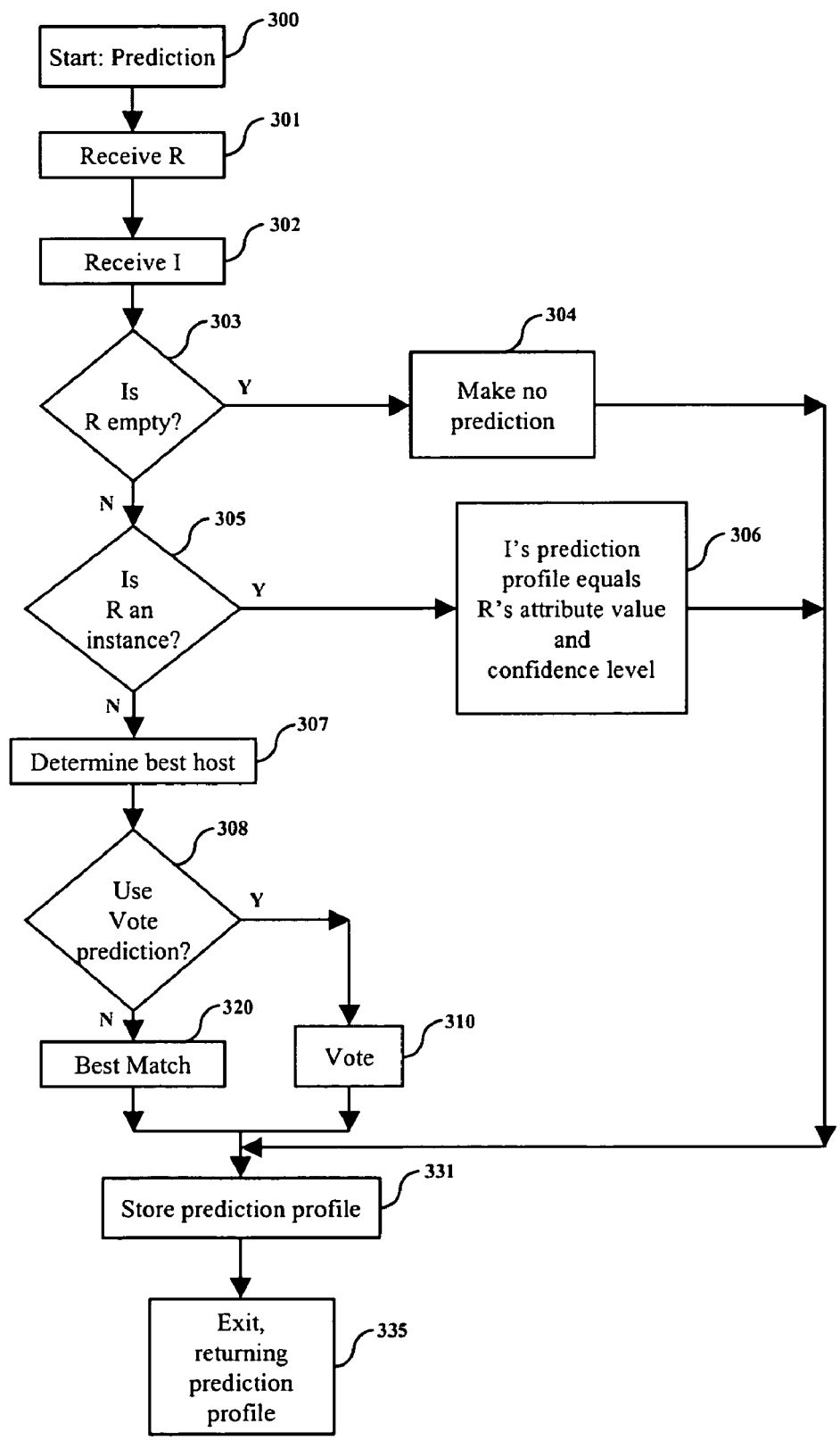
FIG. 6 comprises a flowchart of an embodiment of an overall methodology used for predicting attribute values.

FIG. 6 comprises a flow chart of an embodiment of an overall methodology used in predicting attribute values. Computational server 135 implements the prediction methodology by first receiving a pre-existing classification structure and an instance to be predicted from secondary storage 125. Next, computational server 135 determines a best host for the instance to be predicted, and places that instance to be predicted within a location relative to at least one best host child within the pre-existing classification tree, and calculates and returns a prediction profile to the display station 130.

Referring now to FIG. 6, the subject of prediction is discussed in detail. In one embodiment of the present invention, computational server 135 starts executing a prediction routine at step 300, receiving a root node R of a classification tree at step 301, and receiving at step 302 an incomplete or new instance, I, for which at least one attribute value will be predicted.

In step 303, computational server 135 determines whether R is empty. If so, then no prediction is made, as per step 304, and a NULL prediction profile is stored at step 331.

In step 305, computational server 135 determines whether R is an instance. If so, then the prediction made is that I's prediction profile, comprising at least one attribute value and corresponding confidence level, is the same as R's prediction profile, comprising an attribute value and associated confidence level. Note that a confidence level comprises a prediction weight. The resulting prediction profile is stored at step 331.

In step 307, computational server 135 determines the best host as previously discussed in FIG. 2 and FIG. 3. As discussed in FIG. 3, the best host determination proceeds by the computational server 135 processing class concept nodes, comprising receiving a class concept node of a classification tree, calculating a delta cohesiveness measure (ΔCM) value between the instance to be classified and the class concept node, and storing the largest ΔCM value and corresponding class concept node at each level of the tree. The computational server 135 then determines the largest ΔCM value over all levels of the tree and stores the class concept node corresponding to the largest ΔCM value as the best host. Computational server 135 performs this best host determination process recursively in one embodiment.

Next, computational server 135 decides at step 308 whether Vote prediction has been requested. If so, computational server 135 executes the Vote prediction module of step 310, which is discussed in detail in FIG. 7. If not, computational server 135 executes the Best Match prediction module of step 320, which is discussed in detail in FIG. 8.

After the appropriate prediction routine has been executed (step 304, 306, 310 or 320), computational server 135 stores a prediction profile in step 331. Processing exits at step 335, returning a prediction profile. A prediction profile comprises at least one attribute value and corresponding confidence level (i.e., prediction weight).

One embodiment of the present invention uses a Vote methodology for determining a prediction profile. Another embodiment of the present invention uses a Best Match methodology for determining a prediction profile.

Figure 7:
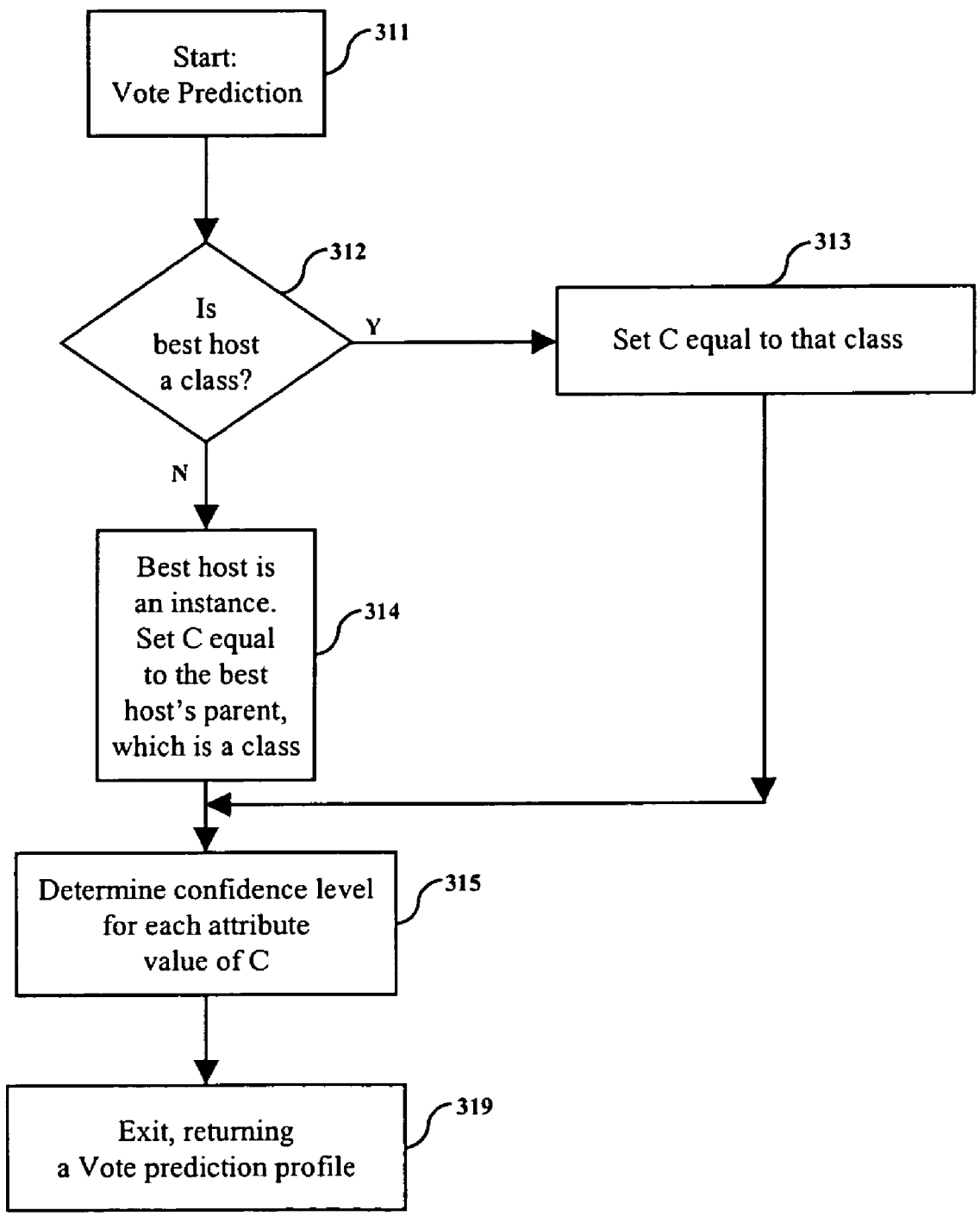
FIG. 7 comprises a flowchart of an embodiment of a Vote methodology used for predicting attribute values.

FIG. 7 shows a flowchart of an embodiment of a Vote methodology for predicting attribute values. Computational server 135 implements the Vote prediction method for determining confidence levels by applying weighted voting over each value for at least one target attribute of the best host children.

Referring now to FIG. 7, Vote methodology prediction is discussed in detail. Computational server 135 starts the Vote prediction module at step 311. In step 312, computational server 135 ascertains whether the best host, which was determined in step 307 of FIG. 6, is a class. If the best host is a class, computational server 135 sets C equal to that class in step 313. If the best host is an instance, computational server 135 sets C equal to the best host's parent class in step 314. Computational server 135 then determines for C the attribute values and confidence level for each attribute of C in step 315. Process step 315 is further described in the discussion on FIG. 9. Processing then exits via step 319, returning a prediction profile.

Figure 8:
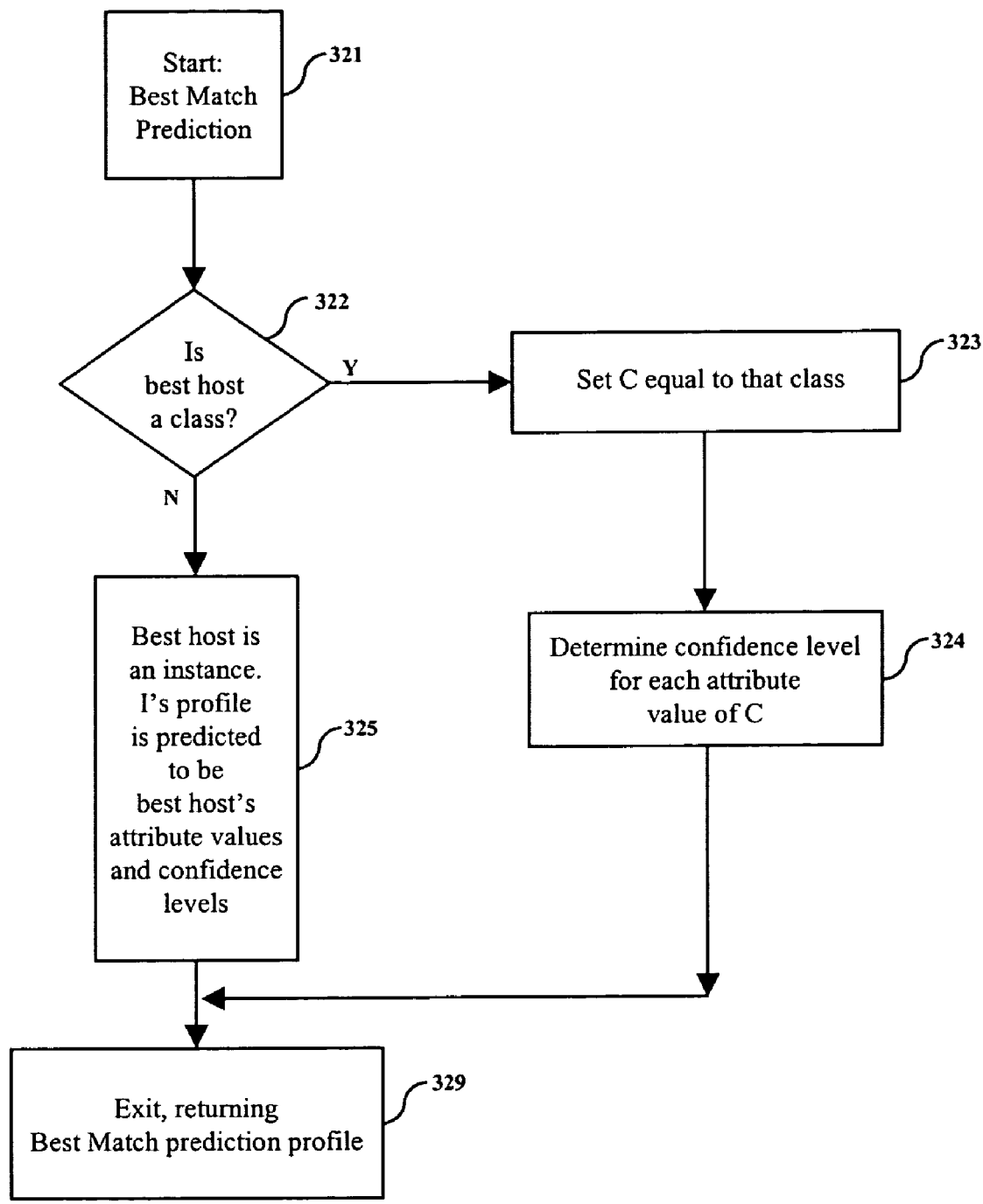
FIG. 8 comprises a flowchart of an embodiment of a Best Match methodology used for predicting attribute values.

FIG. 8 shows a flowchart of an embodiment of a Best Match methodology used for predicting attribute values. Computational server 135 implements the Best Match prediction method for determining confidence levels by applying weighted voting over each value for the target attribute(s) of the children of the best host, if the best host is a class concept node. Computational server 135 implements the Best Match prediction method for determining confidence levels by assigning the confidence level of the best host to the attribute values to be predicted, if the best host is an instance node.

Referring now to FIG. 8, Best Match methodology prediction is discussed in detail. Computational server 135 starts the Best Match prediction routine at step 321. In step 322, computational server 135 ascertains whether the best host, which was determined in step 302 of FIG. 6, is a class. If the best host is a class, computational server 135 sets C equal to that class in step 323, and determines for C the attribute values and confidence level for each attribute value in step 324, which is further described in the discussion on FIG. 9. If the best host is an instance, I's prediction profile is determined to be the same as that for the best host (i.e., the same attribute values and confidence levels). Processing then exits at step 329, returning a prediction profile.

Figure 9:
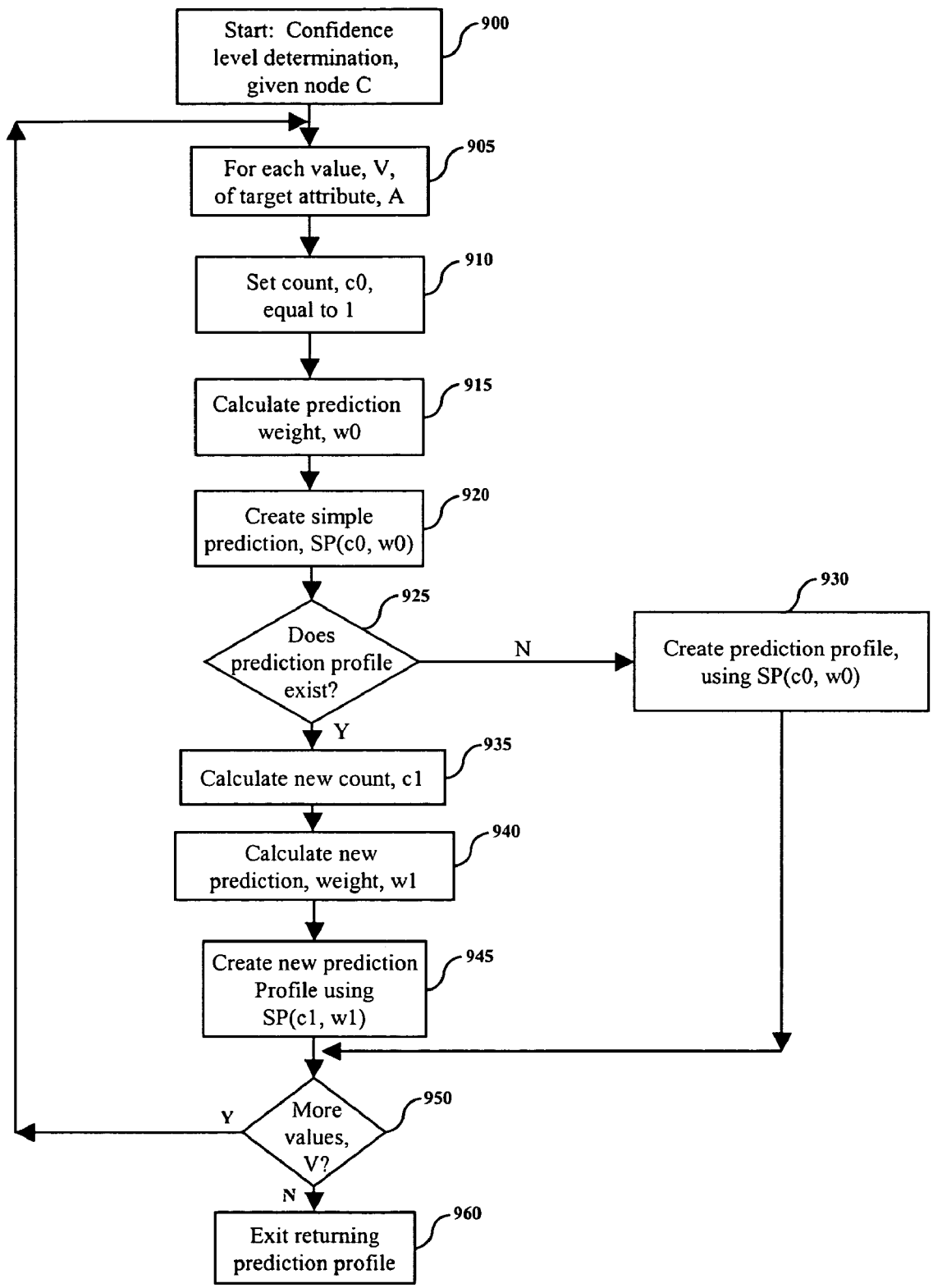
FIG. 9 comprises a flowchart of an embodiment of a mechanism for use in both Vote and Best Match prediction routines for determining a confidence level of attribute values.

FIG. 9 shows a flowchart of the mechanism used in the Vote prediction routine for determining the confidence level and predicted values for at least one target attribute, using weighted voting over each value for the at least target attribute of the best host children. A target attribute is also known as an attribute to be predicted. This mechanism takes place at step 315 in FIG. 7 in an embodiment which implements Vote prediction. Note that this mechanism is also used in Best Match prediction when the best host node is a class node. This mechanism takes place at step 324 in FIG. 8 in an embodiment that implements Best Match prediction.

Computational server 135 starts an embodiment of the FIG. 9 confidence level determination routine at step 900, given node C. The value of C is set in step 313 or 314 of FIG. 7, or step 323 of FIG. 8. Node C represents a best host, if the best host is a class node, or the parent of a best host, if the best host is an instance node. The confidence levels calculated in FIG. 9 comprise prediction weight values in a prediction profile.

After executing step 900, computational server 135 next loops over each value, V, of target attribute, A, found in node C, beginning in step 905. Count, c0, is set to 1 (in step 910) and the prediction weight, w0, is then calculated by computational server 135 in step 915. The prediction weight, w0, is calculated by multiplying the similarity function (applied to C and the instance to be predicted, I) by the probability of attribute value, V, i.e., sim(C,I)*p(A|V). The function p(A|V) represents the probability that the A attribute within node C is associated with attribute value V in a feature, which is a three tuple comprising an attribute, a value and a count of the occurrences. For example, if C had 2 features of "size=large" and one feature of "size=small", then p(size|small)=⅓. In other words, the contribution of value V should be equal to the proportion of attribute A's values represented by V in node C. Alternate embodiments comprise other methods of computing p(A|V) within the framework provided herein.

A simple prediction, SP, is then created in step 920, using the values c0 and w0. A simple prediction is a container for the count, c0, and prediction weight, w0, values. A simple prediction, SP(c0,w0), is added to a prediction profile for each value, V, of target attribute, A, found in node C.

Next, computational server 135 determines whether a prediction profile exists in step 925. The prediction profile contains the resultant prediction weight and count for all simple predictions. If a prediction profile does not exist, then computational server 135 creates a prediction profile in step 930, using a simple prediction SP(c0,w0). Thus, at step 930, a prediction profile, PP(c,w), is initialized so that PP.c=SP.c0 and PP.w=SP.w0. Computational server 135 then continues at step 950, determining whether more values, V, exist. If not, computational server 135 exits, returning a prediction profile, PP(c,w), at step 960.

If a prediction profile exists in step 925, then computational server 135 calculates a new count, c1, in step 935, calculates a new prediction weight, w1, in step 940, and updates the prediction profile in step 945. The new count, c1, is calculated in step 935 as follows: c1=c0+PP.c, where c0 is the count from the simple prediction, and PP.c is the existing prediction profile count. The new prediction weight, w1, is calculated in step 940 as follows:

$$w1=(c0*w0+PP.c*PP.w)/(c0+PP.c),$$

where c0 is the count from the simple prediction, w0 is the prediction weight from the simple prediction, PP.c is the existing prediction profile count, and PP.w is the existing prediction profile prediction weight. The prediction profile, PP(c,w), is then updated in step 945 such that PP.c=c1 and PP.w=w1.

Computational server 135 then continues at step 950, determining whether more values, V, exist. If not, then computational server 135 exits, returning a prediction profile at step 960.

To illustrate how classification and prediction go hand-in-hand, note that an embodiment of the present invention allows an operator to determine the importance of attributes, and reconstitute classification trees to decrease the number of attributes per node that must be processed during the prediction process. Computational server 135 receives from secondary storage 125 a data set comprising instances to be classified, wherein these instances to be classified are comprised of at least two attributes and corresponding relevance values. Computational server 135 builds a first classification tree from the data set of instances to be classified, using all attributes, and determines the prediction accuracy for the first classification tree. In one embodiment, the prediction accuracy is determined as the average performance of the model on a test partition, wherein the test partition comprises a training or standard data set. Computational server 135 establishes at least one prediction accuracy acceptability criterion. In another embodiment, a prediction accuracy acceptability criterion is a configuration parameter, such as a threshold value for a confidence level. A threshold value may be provided by the system provider, a system administrator, the user, or automatic based on specified attributes.

Next, computational server 135 builds subsequent classification trees, using the classification process previously discussed in FIG. 2 through FIG. 5. However, computational server 135 includes fewer attributes for each instance to be classified with each subsequent build. Again, computational server 135 determines the prediction accuracy of each subsequent classification tree, discarding as unacceptable, those classification trees that do not meet the prediction accuracy acceptability criteria. Computational server 135 retains at least one classification tree which uses less attributes than the first classification tree and which predicts with results that fall within the prediction accuracy acceptability criteria.

Figure 16:
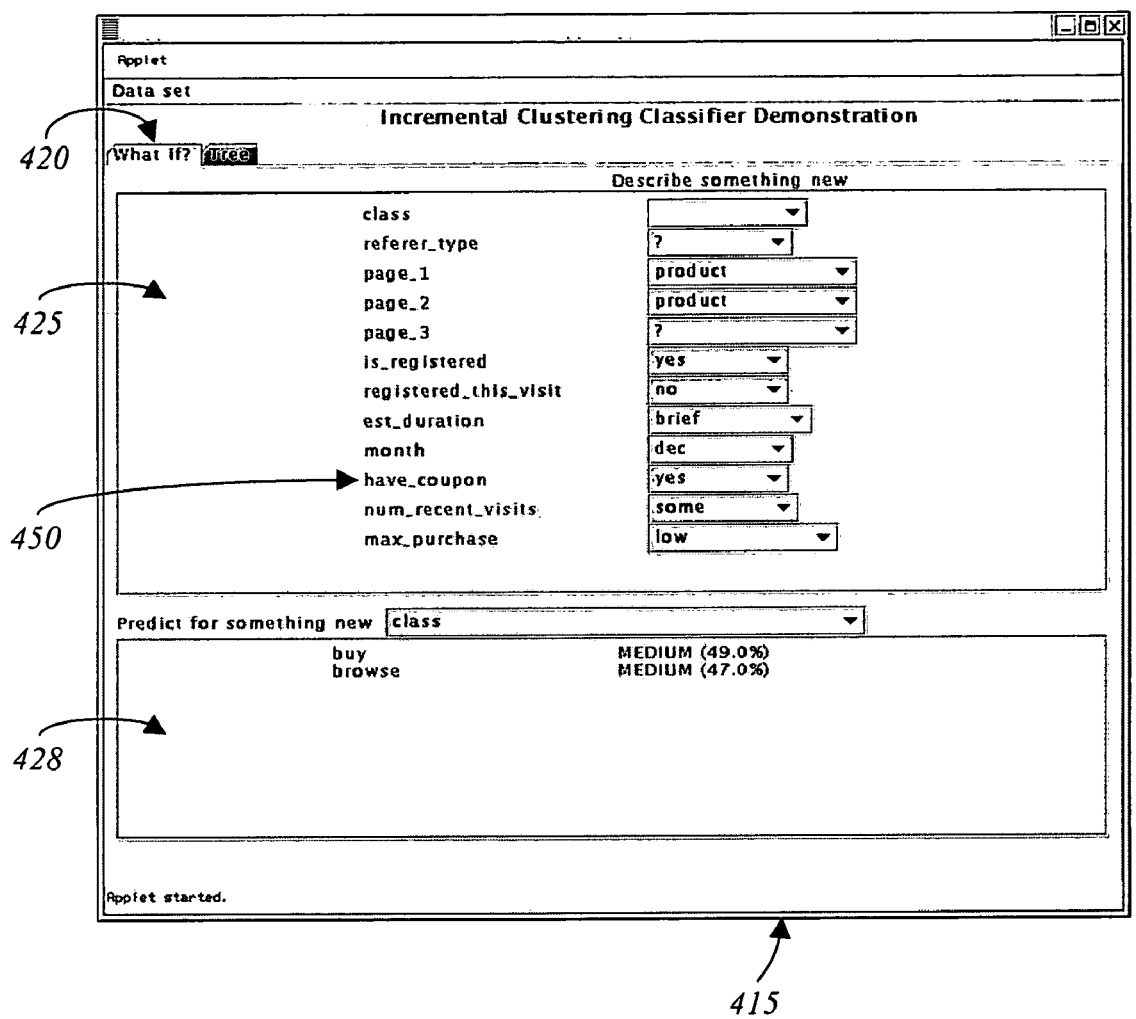
FIG. 16 shows a GUI screen capture which illustrates an advantage of a "What if?" option of an embodiment of the present invention for real-time determination of how modifying an attribute affects a shopper's status.

The determination of attribute importance can be accomplished in two manners. First of all, the operator can make this determination using the "What if?" feature and manually select nodes, remove attributes and analyze the feedback information (i.e., what effects were observed by removing attributes from the attribute list 425 as seen in FIG. 16, which is discussed in the next section).

The alternate method, which is less time intensive, is to allow an embodiment of the present invention to determine prediction profiles over all of the attributes. Then the system can automatically, or the operator can manually, analyze those profiles for attribute values with confidence level values below a pre-specified threshold level. The system, automatically, or the operator, manually, can then remove those attributes deemed unimportant and rebuild the classification tree with instances containing fewer attributes. In one embodiment, this process may be performed several times until the average confidence level over all of the instance attribute values drops below a pre-specified acceptance level. The resultant classification tree is that classification tree which contains nodes with the fewest instance attributes and still meets the pre-specified acceptance level.

Next, an exemplary scenario showing interactions between a web user, web site and an embodiment of the present invention is discussed. FIGS. 4A through 4H illustrate the web pages that are seen on computer 110 by a shopper navigating through the MuscleShoppe.com web site, and the corresponding graphical user interface (GUI) 415 seen on the display station 130 as an embodiment of the present invention executes.

Figure 10:
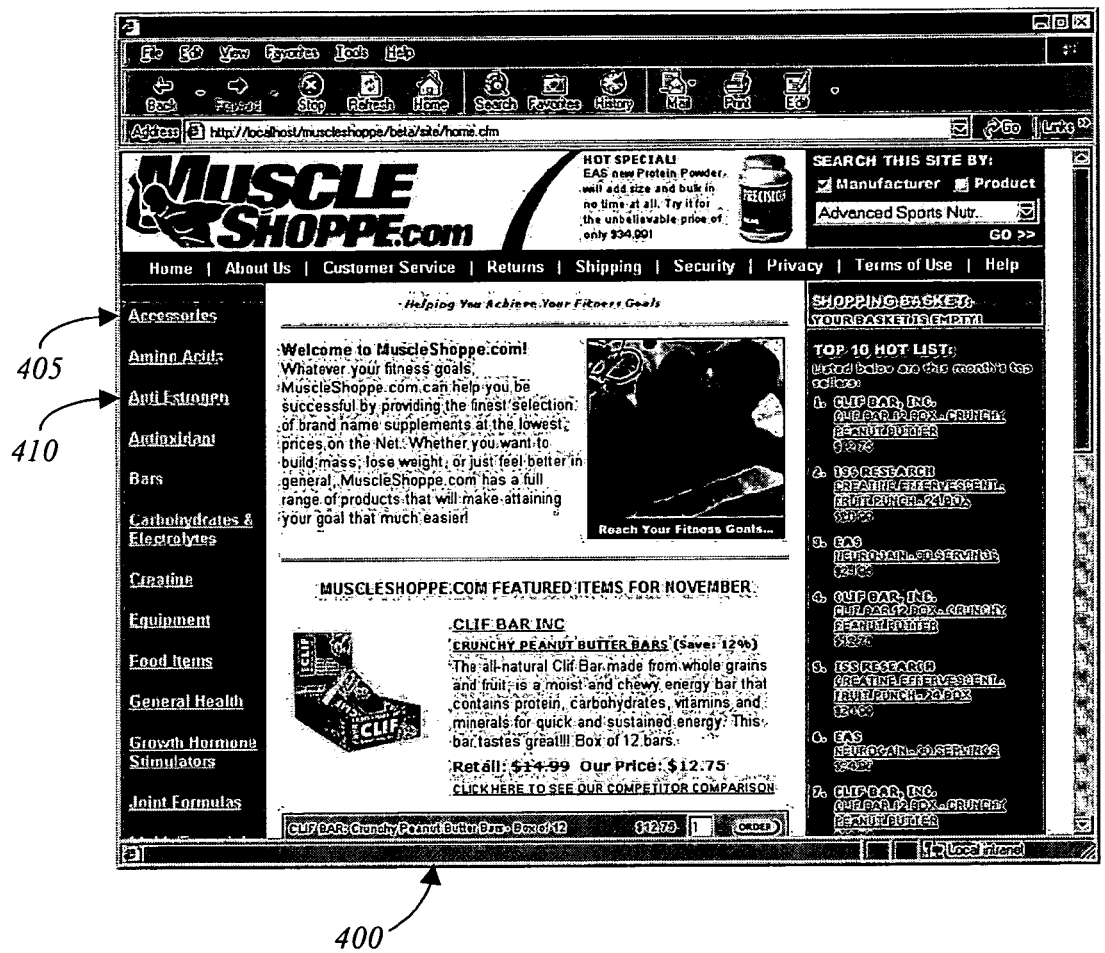
FIG. 10 shows a GUI screen capture of the home page of a web site, MuscleShoppe.com.

FIG. 10 shows a GUI screen shot of a web site called MuscleShoppe.com. Referring to FIG. 10, the shopper has loaded the home page 400 for the web site MuscleShoppe.com into a web browser on computer 110.

Figure 11:
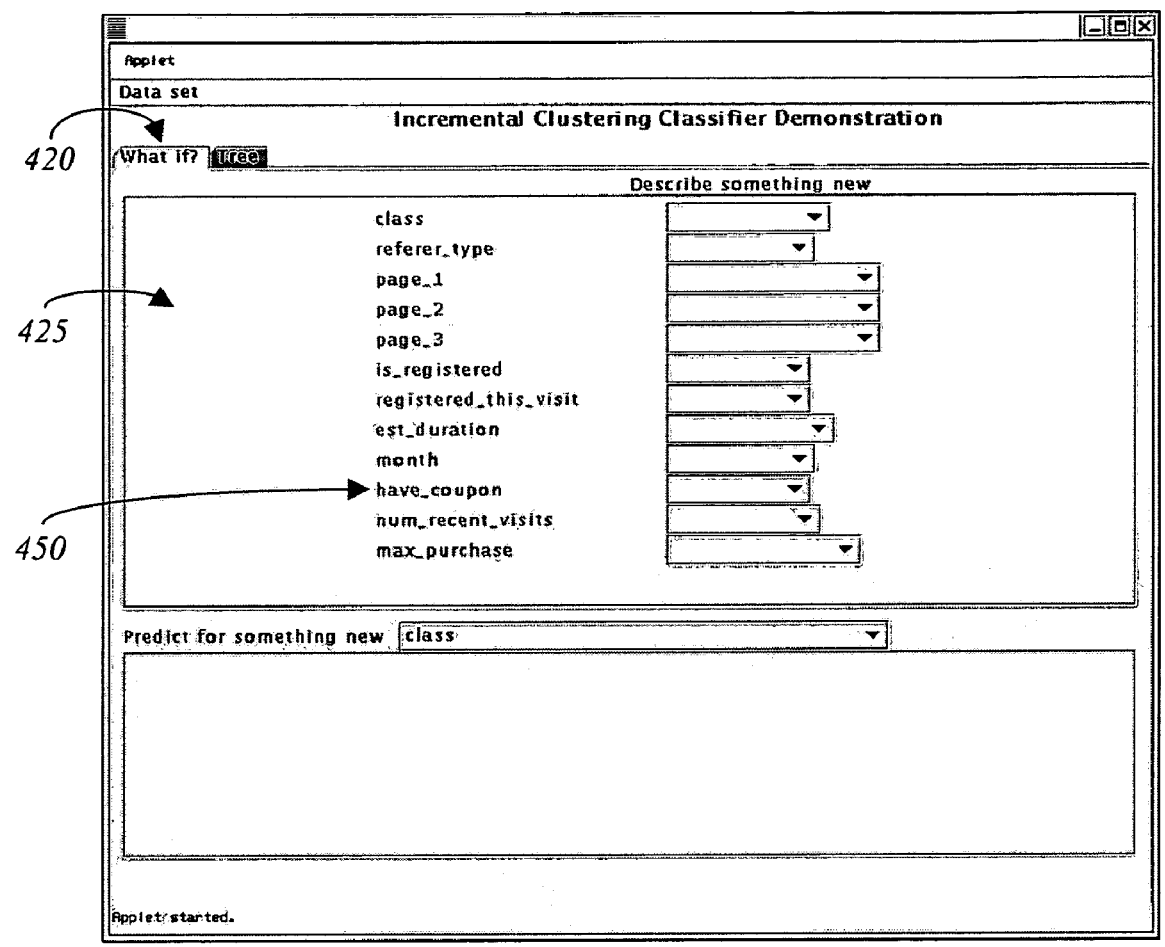
FIG. 11 shows a GUI screen capture of an example of the "What if?" feature for a set of user (web shopper) attributes.

FIG. 11 shows a GUI screen capture of an example of the "What if?" feature of an embodiment of the present invention for a set of user attributes. The user, in this case, is a web shopper. In FIG. 11, a GUI window 415 with the "What if?" tab 420 selected, shows an attribute section 425, which contains a list of attributes associated with each node of a classification tree.

Figure 12:
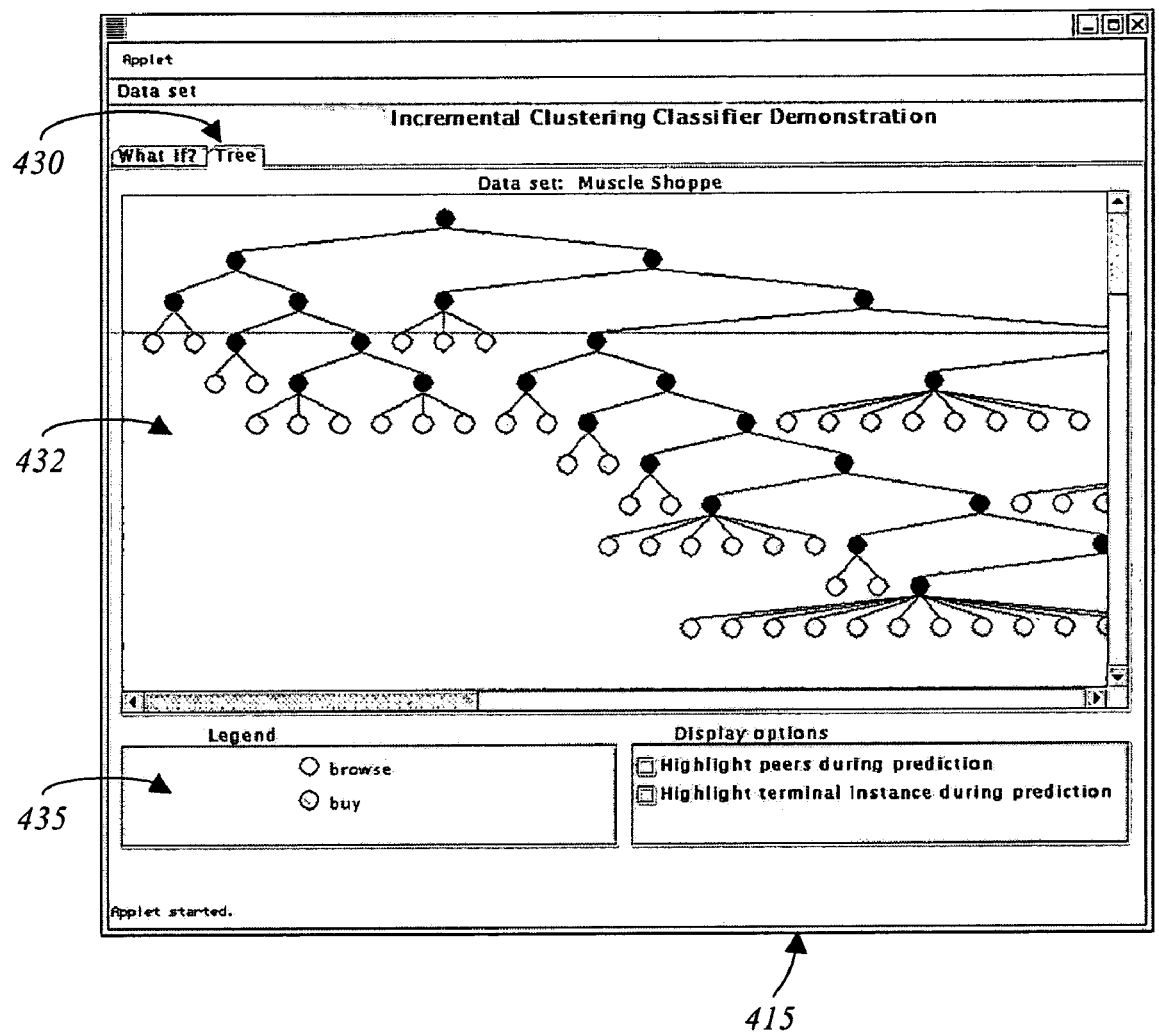
FIG. 12 shows a GUI screen capture of a classification tree with distinguishing features visually contrasted.

FIG. 12 shows a GUI screen capture of a classification tree with the tree's nodes visually contrasted based upon distinguishing features. An embodiment of the present invention comprises visually contrasting classification tree nodes based upon distinguishing features, in which computational server 135 displays a classification tree on display station 130, determines at least one distinguishing feature of the instance to be classified, and visually contrasts the instance to be classified within the classification tree displayed on display station 130, based upon the distinguishing feature or features. As explained below, an embodiment implements this feature using an instance tag and display code for interpreting that instance tag. The instance tag may be associated with a distinguishing feature that represents an attribute, context and/or relationship value.

Referring to FIG. 12, an operator of an embodiment of the present invention, using the display station 130 of FIG. 1, has selected the "Tree" tab 430 of the GUI window 415, and a graphical representation of the classification tree is shown in scrollable pane 432. In the "Legend" section 435 of the GUI window 415, the distinguishing features are the attributes "browse" and "buy" which are colored gray and white, respectively. This contrast of distinguishing features allows an operator of an embodiment of the present invention to quickly recognize the regions in the classification tree of scrollable pane 432 where buyers are clustered and to select the white-colored classification tree nodes to view the attributes of these buyers.

One skilled in the art would recognize that visual contrasting of distinguishable features may be implemented in a number of ways. For example, various embodiments use an instance tag for a display property to enable nodes to be represented using different distinct colors (i.e., red, white, blue), gradations of color (shades of gray to represent the degrees to which an instance belongs in a certain genre), shapes, location in the tree (even overlapping of nodes), 3D rendering, even sound and/or a warping of the cursor or scrollable pane to focus an operator in on an extremely important node of the classification tree. Display code reads the instance tag display property and colors, shades, 3D renders, emits a sound or warps the focus of an operator accordingly.

In addition, one skilled in the art could readily perceive of other domains in which the visualization feature of an embodiment of the present invention would be a valuable diagnostic tool. For instance, attributes of breast cancer patients, such as age, weight, results from various tests, and other characterizations, could be used in building a classification tree with nodes visually represented for the distinguishing features of benign and malignant. A conventional classification tree could easily overwhelm researchers or health care professionals as the number of patients becomes exceedingly large. However, accuracy is theoretically improving as the number of patients (data points) increases, and thus researchers or health care professionals want to be able process a large amount of historical patient data. The visualization feature allows a researcher or health care professional to quickly hone in on the "bottom line" (i.e., benign or malignant) in assessing patient risk rather than waste time wading through large amounts of data.

Additionally, by being able to readily visualize where a patient falls within a classification tree with respect to a distinguishing feature, a doctor could select a neighboring node in which a higher "malignant" probability exists, and recommend lifestyle changes to the current patient that would be more likely to keep this patient in a "benign" region of the classification tree. Note that in this way, an embodiment of the present invention's visualization feature aids in allowing the doctor to select the appropriate attributes to vary when using the "What if?" feature to modify attribute values quickly and easily, and thereby determine the effect on predicted confidence levels for distinguishing features in real-time.

Figure 13:
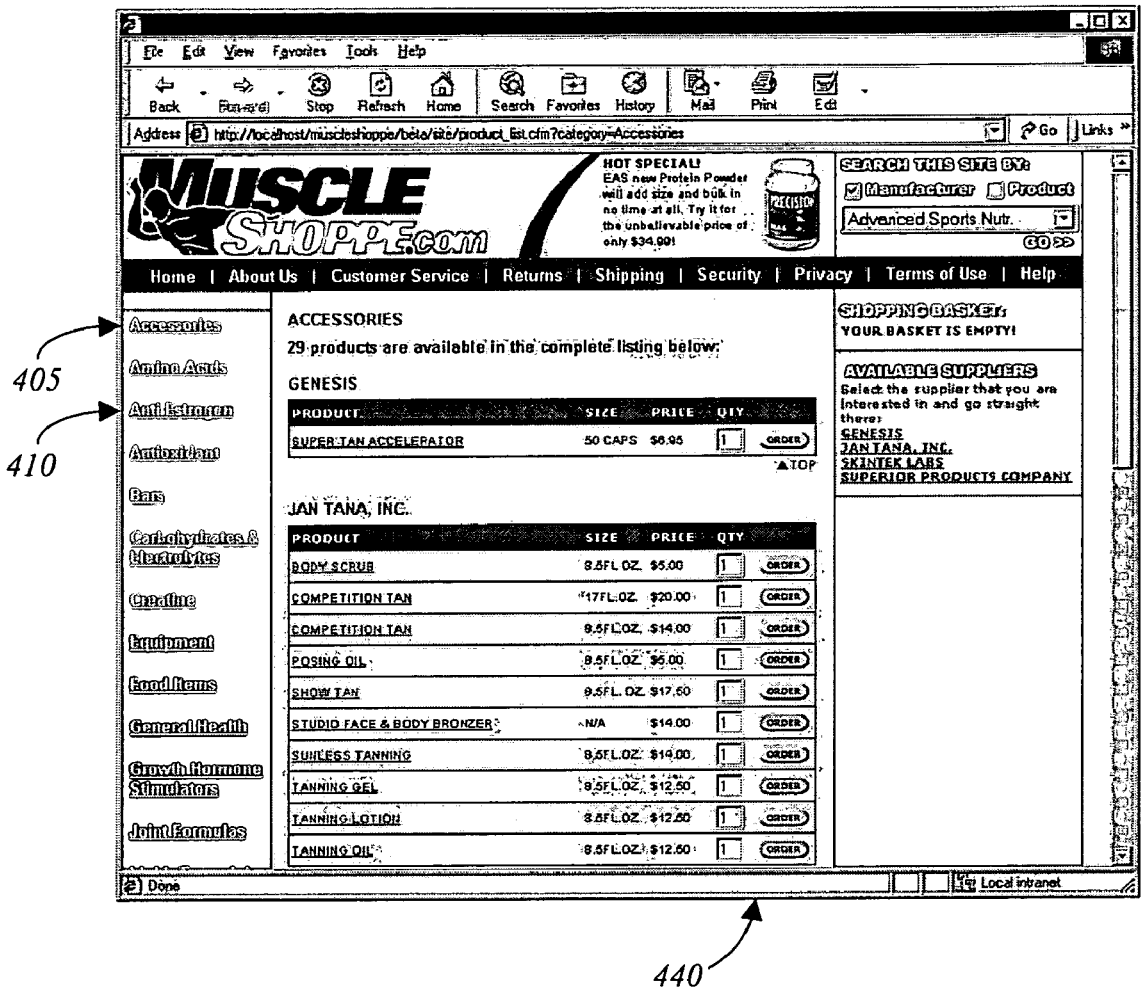
FIG. 13 shows a GUI screen capture of the "Accessories" page of a web site, MuscleShoppe.com.

FIG. 13 shows a GUI screen capture of the "Accessories" web page. Referring now to FIG. 13, the shopper has selected the Accessories link 405, and web server 140 has returned the Accessories web page 440 to the shopper's computer 110. FIG. 13 shows the returned Accessories web page 440 for the MuscleShoppe.com web site. In the background, an embodiment of the present invention has collected data on the shopper.

Figure 14:
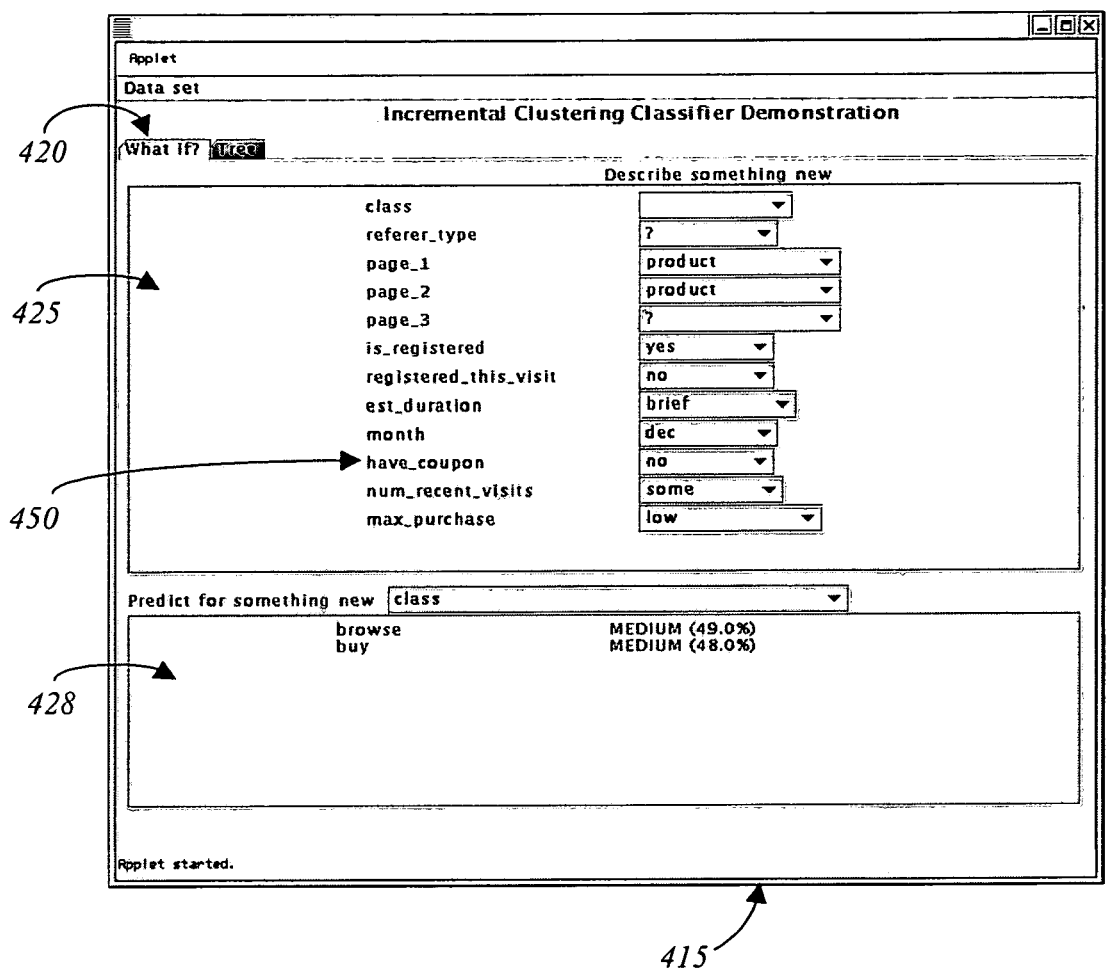

FIG. 14 shows a GUI screen capture of a "What if?" option of an embodiment of the present invention with collected attribute values and predicted browse/buy confidence levels for a web shopper filled in. Referring to FIG. 14, the selection of the "What if?" tab 420 on the GUI window 415 reveals the attribute data that has been collected on the web shopper. The data collected has been filled in for the appropriate attributes in the list of the attribute section 425 of the GUI window 415. And, the predicted confidence levels of the distinguishing features, browse (49.0%) and buy (48.0%), are displayed in the prediction section 428 of the GUI window 415.

Figure 15:
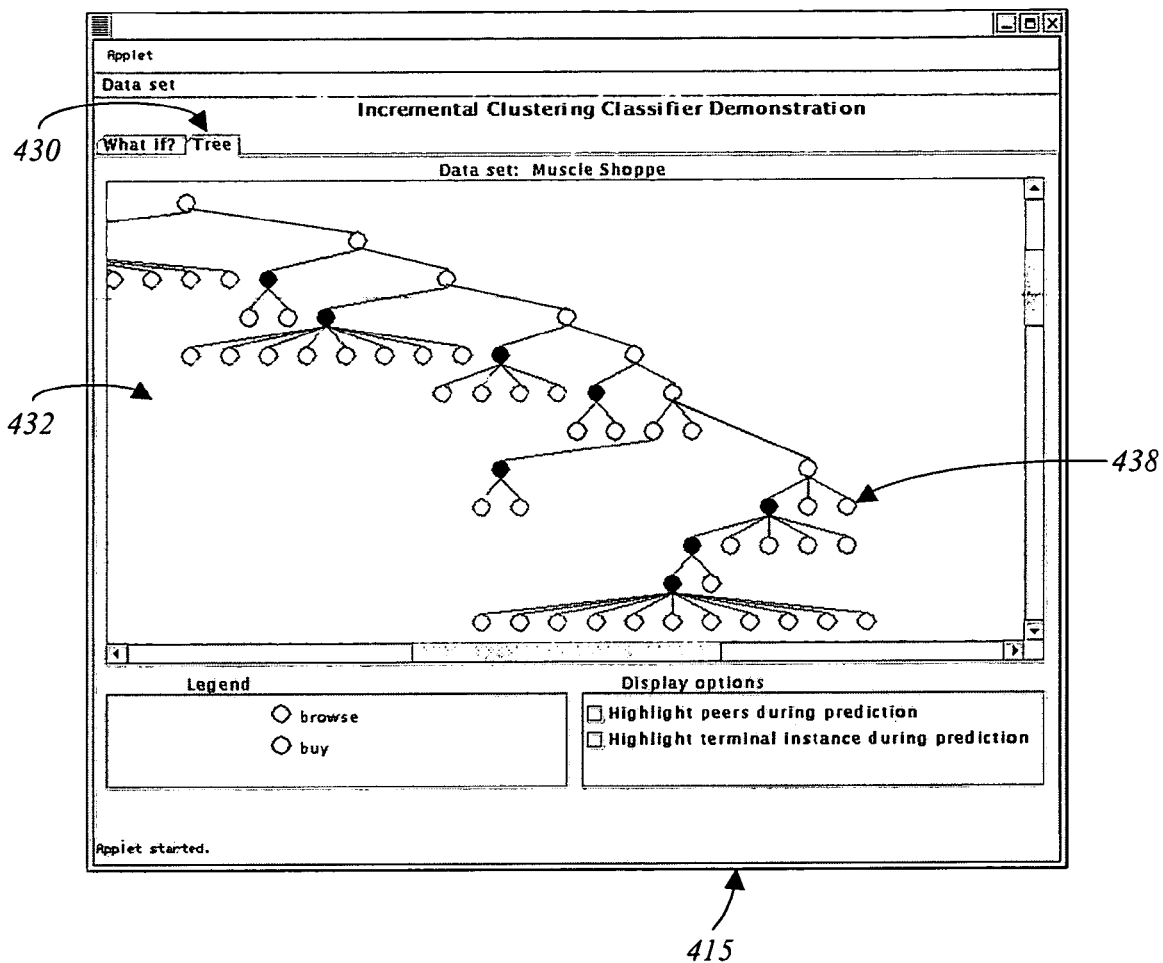
FIG. 15 shows a GUI screen capture of a "Tree" option of an embodiment of the present invention selected, and a classification tree displayed that shows a web shopper node inserted.

FIG. 15 shows a GUI screen capture of a "Tree" option of an embodiment of the present invention selected, and a classification tree displayed that shows a web shopper node inserted. Referring now to FIG. 15, the "Tree" tab 430 has been selected in the GUI window 415, and in the scrollable pane 432 the classification tree appears with the shopper inserted as a highlighted gray browse node 438.

The visualization feature of an embodiment of the present invention can be used whether prediction or classification operations are taking place. An embodiment of the present invention comprises visually contrasting classification tree nodes based upon distinguishing features, in which computational server 135 displays a classification tree on display station 130, determines at least one distinguishing feature of the instance to be predicted, and visually contrasts the instance to be predicted within the classification tree displayed on display station 130, based upon the distinguishing features. As discussed above, an embodiment implements this feature using an instance tag and display code for interpreting that instance tag. The instance tag may be associated with a distinguishing feature comprising attribute, context and/or relationship values.

Referring now to FIG. 16, a GUI screen capture shows a "What if?" option of an embodiment of the present invention for use in a real-time determination of how modifying an attribute value affects a shopper's status. The owner of the website would like to turn the shopper into a buyer. In FIG. 16, selection of the "What if?" tab 420 has revealed that an embodiment of the present invention has determined that if the attribute "have_coupon" 450 in attribute section 425 is changed to "yes", then the shopper is now more likely to buy (49.0%) than to browse (47.0%), as shown in the prediction section 428 of GUI window 415. This determination is then communicated from computational server 135 to web server 140 of FIG. 1.

Figure 17:
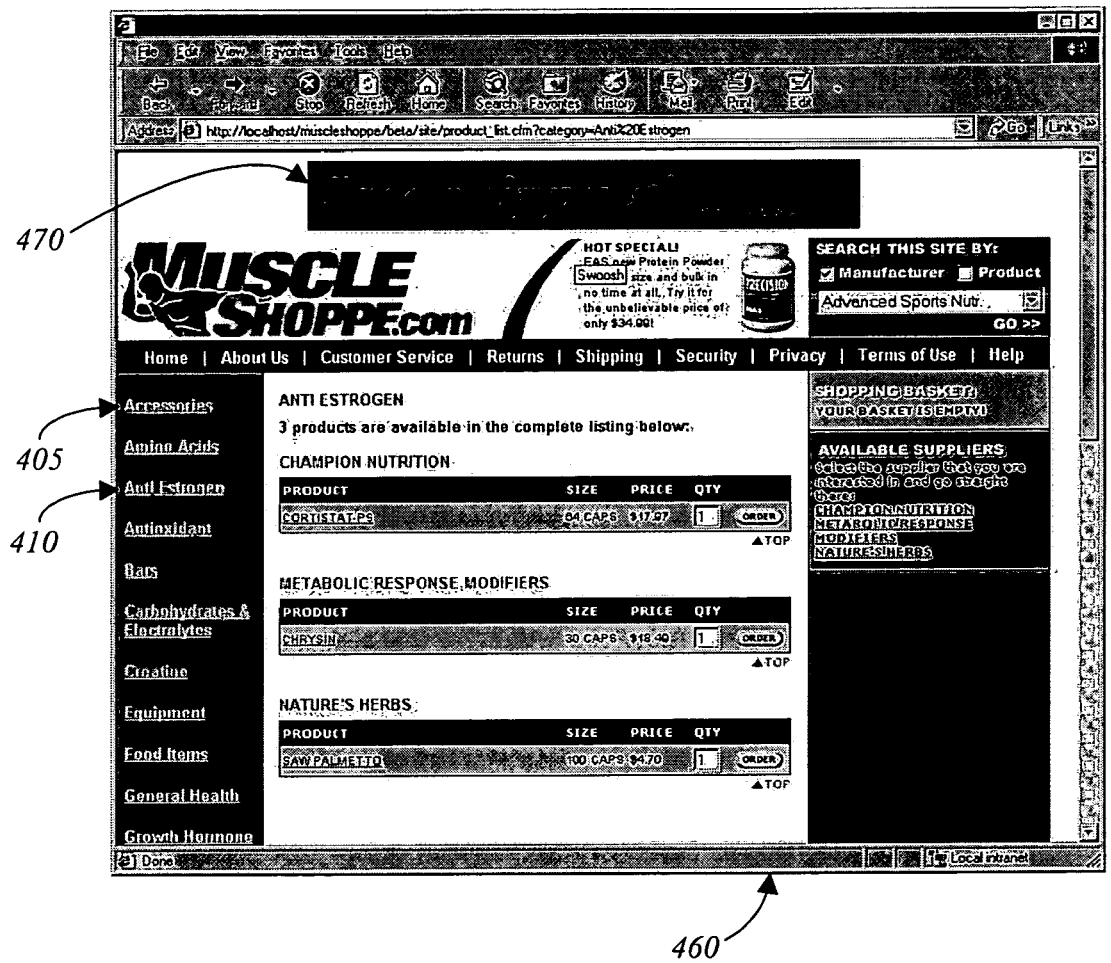
FIG. 17 shows a GUI screen capture of a web page with an attached coupon for the MuscleShoppe.com site.

FIG. 17 shows a GUI screen capture of a web page with an attached coupon from the MuscleShoppe.com site. When the shopper selects the AntiEstrogen link 410 from the Accessories web page 440, the web server 140 returns the AntiEstrogen web page 460 shown in FIG. 17 with a coupon 470 inserted at the top center of the page. In this case, the "coupon" 470 is a financial incentive (i.e., free shipping). Other financial incentives include, but are not limited to, mark downs and bulk purchase discounts. Non-financial incentives, including, but not limited to, additional information on the product or an offer to contact a live sales representative, could also be offered to the shopper.

Figure 18:
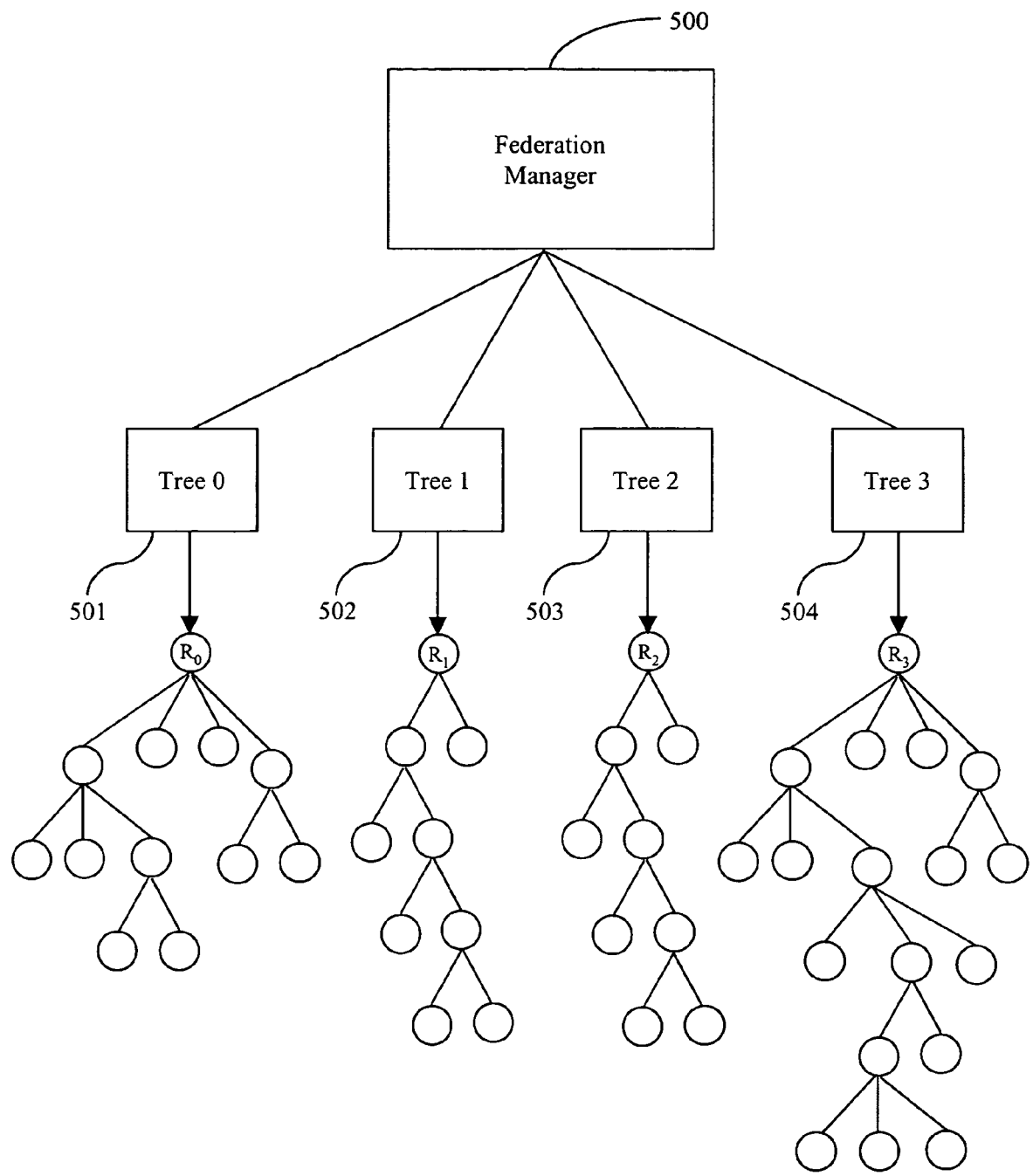
FIG. 18 shows an embodiment of a federated group of trees and a federation manager, according to the present invention.

The topic of federation is discussed next by referring to FIG. 18, which shows a federated group of trees 501, 502, 503, 504 and a federation manager 500. Federation manager 500 receives a data set, comprising at least one instance to be classified, receives a federated group number, and then proceeds to construct several classification trees by selecting a subset of the federated group number of classification trees and classifying a copy of an instance to be classified into each classification tree that is a member of the subset. An embodiment of the present invention comprises selecting the subset of classification trees randomly, each time an instance from the data set is to be classified.

Federation comprises a use of multiple classification trees. In the preferred embodiment, federation takes advantage of parallel processors and allows for prediction feedback from more than one tree. It is very scalable, enabling an embodiment of the present invention to process very large data sets without the noticeable degradation exhibited by conventional classification and prediction techniques.

Several new terms are introduced for the federation process. A federated (or federation) group is the total number of classification trees used in the federation process. In FIG. 18 there is a federated group of four classification trees 501, 502, 503, 504. The prediction coverage is the number of trees in the federated group that are queried for a prediction. The classification overlap is the number of trees in the federated group into which each instance of the data set is to be randomly classified. And, a federation manager 500 oversees the federated group, managing the prediction and classification processes.

As previously stated, in the preferred environment, the federation process executes on multiple processors within a parallel processing environment. Each classification tree 501, 502, 503, 504 of the federated group will execute on its own processor. Note that all trees could be executed on a single processor, but the performance in this case would obviously be inferior to that of a multiprocessor or parallel computing environment. Additionally, an embodiment of the present invention in a parallel processing environment facilitates real-time processing.

The federation process employs either a group of pre-existing classification trees or builds a group of trees from a data set. Pre-existing trees may be classification trees built using the methods of an embodiment of the present invention or using other techniques.

If the federated group is to be built from a data set using the classification methods of an embodiment of the present invention, then the classification overlap is used to decide into how many trees of the federated group an instance is to be classified. In FIG. 18, four trees 505, 506, 507, 508 are in the federated group. A classification overlap of two would mean that each instance in the data set would be inserted into two trees of the federated group. The specific two trees are randomly chosen for each instance. The classification and insertion processes take place in accordance with the classification mechanisms previously described for an embodiment of the present invention in FIG. 2 through FIG. 5, but with slight modifications to accommodate the federation process. For instance, the computational server 135 executing the federation manager 500 receives copies of the instance to be classified (the number of copies equal to the classification overlap), determines the best host in each classification tree into which a copy of the instance is to be classified, and inserts a copy of the instance into each classification tree relative to at least one child of the best host determined for each classification tree. Each instance (or copy) and node of the classification tree comprises at least one attribute value and corresponding relevance weight.

A federated group of classification trees may also be used for prediction purposes. The federation manager 500 (executing on computational server 135) receives a federated group of classification trees and an instance with at least one attribute to predict. Federation manager 500 queries a subset of the classification trees (i.e., the prediction coverage number) to perform a prediction for an instance to be predicted. Federation manager 500 then coalesces the prediction profiles returned from the queried classification trees into one prediction profile that is returned to display station 130.

At the individual tree level, prediction using the federation process is the same as that previously discussed for a single tree. A queried tree within the federation group will return to the manager 500 a prediction that was the resulting profile from either a Vote or Best Match prediction computation. The prediction method chosen was previously set as a system configuration parameter, in one embodiment of the present invention.

However, at the federation level, a further step must take place to coalesce the prediction results from the prediction coverage trees into one prediction profile for the entire federation. The federation manager 500 facilitates this process using either the Ameliorate or the Winner-take-all method, which was previously set as a configuration parameter, in one embodiment of the present invention.

With the Ameliorate method, federation manager 500 (executing on computational server 135) receives the predicted profiles (or solution sets) from the queried classification trees, adds them together, and returns an average prediction profile to display station 130. This average prediction profile consists of a set of predicted attribute values and a confidence level for each predicted attribute value.

In the Winner-take-all method, the federation manager 500 looks at the prediction profiles returned by each of the queried prediction coverage classification trees. Federation manager 500, then returns to a display station 130 that prediction profile from the set of profiles that has the highest confidence level.

Particularly when implemented on multiple or parallel processors, the federation process of an embodiment of the present invention provides several advantages over conventional single tree methods. First of all, federation is one aspect of the present invention that enables real-time processing. Additionally, the federation capability makes the present invention very scalable. That is, federation permits an embodiment of the present invention to be applied to very large data sets without suffering a noticeable degradation in performance.

Federation also lessens the effects of simultaneously having a classifier and at least one predictor in the same tree. This condition can greatly slow down processing in a single tree application, but with federation, multiple trees can be in use at the same time, taking advantage of both federation and multiprocessing/parallel processing.

In addition, federation may be employed to overcome or lessen known or suspected deficiencies among various classification techniques. As previously stated, a federated group may be comprised of trees constructed via many different classification methods. By selecting a federated group and prediction coverage value such that only the trees that complement each other (i.e., where one tree's deficiency is another tree's strong suit) are queried, then deficiencies may be overcome or ameliorated.

Another advantageous use of federation, related to the preceding discussion, is as a test bed for different classification techniques. Trees built from the same data set, but using different techniques, can be chosen as the federated group. The classification overlap is essentially 100%, i.e., each instance has been classified in the same order into each tree of the federated group. Querying each tree of this federated group for a prediction (i.e., prediction coverage equals the number of trees in the federation group) results in a set of prediction profiles, which can be analyzed before being coalesced. Other data sets may be used for subsequent tests. Results can be used to analyze the strengths and weakness of the different classification methods over various data set domains.

It should be noted that the present invention can also be embodied as computer readable code on computer readable medium. The computer readable medium comprises any data storage device that can store data, which can thereafter be read by a computer system. Examples of computer readable medium include read-only memory, random access memory, CD-ROMs, magnetic tape, optical storage devices, and DVD discs. The computer readable medium can also be distributed over a network via interconnected computer systems, so that the computer readable code is stored and executed in a distributed fashion.

Various embodiments of the invention have been described in fulfillment of the various objects of the invention. It should be recognized that these embodiments are merely illustrative of the principles of various embodiments of the present invention. Numerous modifications and adaptations thereof will be apparent to those skilled in the art without departing from the spirit and scope of the present invention.

What is claimed is:

1. A computer-implemented method of classifying an instance comprising the steps of:
   receiving an instance to be classified, the instance to be classified comprising at least one attribute and corresponding relevance value;
   determining a best host for the instance to be classified;
   inserting the instance to be classified into a location relative to at least one child of the best host within a classification structure, the classification structure comprising at least one node, and the node comprising at least one attribute and corresponding relevance value; and
   displaying the classification structure;
   determining at least one distinguishing feature of the instance to be classified; and
   visually contrasting the instance to be classified vice nodes within the classification structure, based upon the value of the at least one distinguishing feature.

2. The method of claim 1, wherein determining the best host for the instance to be classified comprises:
   processing class concept nodes of the classification structure, comprising the steps of:
   receiving a class concept node of the classification structure;
   calculating a delta cohesiveness measurement ($\Delta$CM) value between the instance to be classified and the class concept node; and
   storing the largest $\Delta$CM value and the corresponding class concept node at each level of the classification structure;
   determining the largest $\Delta$CM value over all levels of the classification structure; and
   storing the class concept node corresponding to the largest $\Delta$CM value over all levels of the classification structure.

3. The method of claim 2, wherein determining the best host for the instance to be classified is performed recursively.

4. The method of claim 3, wherein inserting the instance to be classified into a location relative to at least one child of the best host within a classification structure comprises:
   selecting at least one best host child node;
   calculating a $\Delta$CM value between the instance to be classified and the at least one best host child;
   storing the $\Delta$CM value associated with each at least one best host child;
   storing a count of the total number of the at least one best host child;
   storing a count of the total number of stored $\Delta$CM values associated with each at least one best host child that are greater than 0.0; and
   adding the instance to be classified to the classification structure as a sibling or child of the at least one best host child, based upon the $\Delta$CM value associated with each at least one best host child, the count of the total number of the at least one best host child, and the count of the total number of stored $\Delta$CM values associated with each at least one best host child that are greater than 0.0.

5. The method of claim 1, wherein the at least one distinguishing feature comprises at least one of an attribute value, a context value and a relationship value.

* * * * *